(12) United States Patent
Morris

(10) Patent No.: US 9,823,838 B2
(45) Date of Patent: Nov. 21, 2017

(54) METHODS, SYSTEMS, AND COMPUTER PROGRAM PRODUCTS FOR BINDING ATTRIBUTES BETWEEN VISUAL COMPONENTS

(71) Applicant: SITTING MAN, LLC, Raleigh, NC (US)

(72) Inventor: Robert Paul Morris, Raleigh, NC (US)

(73) Assignee: Cypress Lake Software, Inc., Woodville, TX (US)

( * ) Notice: Subject to any disclaimer, the term of this patent is extended or adjusted under 35 U.S.C. 154(b) by 0 days.

(21) Appl. No.: 14/331,096

(22) Filed: Jul. 14, 2014

(65) Prior Publication Data

US 2015/0026548 A1    Jan. 22, 2015

Related U.S. Application Data

(63) Continuation of application No. 12/956,008, filed on Nov. 30, 2010, now Pat. No. 8,780,130.

(51) Int. Cl.
*G06F 3/048* (2013.01)
*G06F 9/44* (2006.01)
(Continued)

(52) U.S. Cl.
CPC .......... *G06F 3/04883* (2013.01); *G06F 3/041* (2013.01); *G06F 3/0481* (2013.01);
(Continued)

(58) Field of Classification Search
CPC combination set(s) only.
See application file for complete search history.

(56) References Cited

U.S. PATENT DOCUMENTS 4,839,853 A    6/1989   Deerwester
5,029,013 A    7/1991   Hiratsuka et al.
(Continued)

FOREIGN PATENT DOCUMENTS

EP    1030247    8/2000
GB    2339374    1/2000
(Continued)

OTHER PUBLICATIONS

First Alliance "Security Camera Systems for Your Business or Home," available at https://web.archive.org/web/20100615200435/http://www.faps.com/PC_DVR_H.264_.htm (psoted on Jun. 15, 2010).

(Continued)

*Primary Examiner* — Wesner Sajous
(74) *Attorney, Agent, or Firm* — Patrick E. Caldwell, Esq.; The Caldwell Firm, LLC

(57) ABSTRACT

Methods and systems are described for binding attributes between visual components. A first visual component, including a first presentation space for presenting first data by an operating first application, is detected. Binding information, for the first application, is identified that specifies a mapping between a first visual attribute of the first visual component and a second visual attribute of a second visual component including a second presentation space for presenting second data by a second application. A change to the first visual attribute is detected. In response to the detection of the change, change information is automatically sent to change the second visual attribute according to the mapping.

205 Claims, 11 Drawing Sheets

(51) Int. Cl.
  *G06F 17/24* (2006.01)
  *G06F 3/0488* (2013.01)
  *G06F 3/0484* (2013.01)
  *G06F 3/0481* (2013.01)
  *G06F 3/0486* (2013.01)
  *G06F 3/041* (2006.01)

(52) U.S. Cl.
  CPC .......... *G06F 3/0484* (2013.01); *G06F 3/0486* (2013.01); *G06F 3/0488* (2013.01); *G06F 3/04842* (2013.01); *G06F 3/04845* (2013.01); *G06F 3/04886* (2013.01); *G06F 9/4443* (2013.01); *G06F 17/24* (2013.01); *G06F 2203/04104* (2013.01); *G06F 2203/04803* (2013.01); *G06F 2203/04808* (2013.01)

(56) References Cited

U.S. PATENT DOCUMENTS

| | | |
|---|---|---|
| 5,159,334 A | 10/1992 | Baumert et al. |
| 5,297,039 A | 3/1994 | Kanaegami et al. |
| 5,487,143 A | 1/1996 | Southgate |
| 5,540,597 A | 7/1996 | Budman et al. |
| 5,577,187 A | 11/1996 | Mariani |
| 5,642,518 A | 6/1997 | Kiyama et al. |
| 5,671,295 A | 9/1997 | Miyake |
| 5,696,962 A | 12/1997 | Kupiec |
| 5,712,995 A | 1/1998 | Cohn |
| 5,737,560 A | 4/1998 | Yohanan |
| 5,778,256 A | 7/1998 | Darbee |
| 5,794,233 A | 8/1998 | Rubinstein |
| 5,819,261 A | 10/1998 | Takahashi et al. |
| 5,877,765 A | 3/1999 | Dickman et al. |
| 5,877,767 A | 3/1999 | Yohanan |
| 5,895,465 A | 4/1999 | Guha |
| 5,913,215 A | 6/1999 | Rubinstein et al. |
| 5,917,491 A | 6/1999 | Bauersfeld |
| 5,918,237 A | 6/1999 | Montalbano |
| 5,950,214 A | 9/1999 | Rivette et al. |
| 5,974,409 A | 10/1999 | Sanu et al. |
| 5,978,817 A | 11/1999 | Giannandrea et al. |
| 5,991,751 A | 11/1999 | Rivette et al. |
| 5,991,780 A | 11/1999 | Rivette et al. |
| 5,999,907 A | 12/1999 | Donner |
| 6,008,809 A | 12/1999 | Brooks |
| 6,012,093 A | 1/2000 | Maddalozzo, Jr. et al. |
| 6,014,663 A | 1/2000 | Rivette et al. |
| 6,018,714 A | 1/2000 | Risen, Jr. et al. |
| 6,018,749 A | 1/2000 | Rivette et al. |
| 6,028,602 A | 2/2000 | Weidenfeller et al. |
| 6,037,934 A | 3/2000 | Himmel et al. |
| 6,041,360 A | 3/2000 | Himmel et al. |
| 6,072,486 A | 6/2000 | Sheldon et al. |
| 6,072,491 A | 6/2000 | Yohanan |
| 6,081,829 A | 6/2000 | Sidana |
| 6,100,890 A | 8/2000 | Bates et al. |
| 6,108,651 A | 8/2000 | Guha |
| 6,154,725 A | 11/2000 | Donner |
| 6,173,251 B1 | 1/2001 | Ito et al. |
| 6,189,024 B1 | 2/2001 | Bauersfeld et al. |
| 6,230,171 B1 | 5/2001 | Pacifici et al. |
| 6,243,091 B1 | 6/2001 | Berstis |
| 6,252,597 B1 | 6/2001 | Lokuge |
| 6,263,314 B1 | 7/2001 | Donner |
| 6,266,059 B1 | 7/2001 | Matthews, III et al. |
| 6,275,862 B1 | 8/2001 | Sharma et al. |
| 6,314,423 B1 | 11/2001 | Himmel et al. |
| 6,339,767 B1 | 1/2002 | Rivette et al. |
| 6,353,827 B1 | 3/2002 | Davies et al. |
| 6,381,651 B1 | 4/2002 | Nishio et al. |
| 6,389,434 B1 | 5/2002 | Rivette et al. |
| 6,434,580 B1 | 8/2002 | Takano et al. |
| 6,437,527 B1 | 8/2002 | Rhodes et al. |
| 6,460,058 B2 | 10/2002 | Koppolu et al. |
| 6,473,752 B1 | 10/2002 | Fleming, III |
| 6,478,001 B1 | 11/2002 | Burns et al. |
| 6,493,702 B1 | 12/2002 | Adar et al. |
| 6,546,393 B1 | 4/2003 | Khan |
| 6,571,241 B1 | 5/2003 | Nosohara |
| 6,571,295 B1 | 5/2003 | Sidana |
| 6,578,078 B1 | 6/2003 | Smith et al. |
| 6,601,173 B1 | 7/2003 | Mohler |
| 6,667,751 B1 | 12/2003 | Wynn et al. |
| 6,694,331 B2 | 2/2004 | Lee |
| 6,697,838 B1 | 2/2004 | Jakobson |
| 6,724,403 B1 | 4/2004 | Santoro et al. |
| 6,973,456 B1 | 12/2005 | Elgart |
| 6,973,616 B1 | 12/2005 | Cottrille et al. |
| 7,010,515 B2 | 3/2006 | Nakano |
| 7,028,253 B1 | 4/2006 | Lieberman et al. |
| 7,080,088 B1 | 7/2006 | Lau |
| 7,114,129 B2 | 9/2006 | Awada et al. |
| 7,117,443 B1 | 10/2006 | Zilka et al. |
| 7,194,691 B1 | 3/2007 | Zilka et al. |
| 7,305,625 B1 | 12/2007 | Zilka et al. |
| 7,412,661 B2 | 8/2008 | Sellers et al. |
| 7,552,397 B2 | 6/2009 | Holecek et al. |
| 7,783,990 B2 | 8/2010 | Amadio et al. |
| 7,818,677 B2 | 10/2010 | Ruthfield et al. |
| 7,933,632 B2 | 4/2011 | Flynt et al. |
| 8,010,900 B2 | 8/2011 | Hart et al. |
| 8,117,225 B1 | 2/2012 | Zilka |
| 8,166,411 B2 | 4/2012 | Zhang |
| D665,405 S | 8/2012 | Williams et al. |
| 8,266,541 B2 | 9/2012 | Ishibashi |
| 8,302,026 B2 | 10/2012 | Wang et al. |
| 8,320,026 B2 | 11/2012 | Tanaka |
| 8,341,541 B2 | 12/2012 | Holecek et al. |
| 8,356,258 B2 | 1/2013 | Matthews et al. |
| 8,379,058 B2 | 2/2013 | Kraut |
| 8,381,127 B2 | 2/2013 | Singh et al. |
| 8,457,692 B2 | 6/2013 | Fyke et al. |
| 8,490,019 B2 | 7/2013 | Jarrett et al. |
| 8,560,959 B2 | 10/2013 | Zaman et al. |
| 8,600,446 B2 | 12/2013 | Chiang et al. |
| 8,633,900 B2 | 1/2014 | Jin et al. |
| 8,661,361 B2 | 2/2014 | Morris |
| 8,667,415 B2 | 3/2014 | Rudolph et al. |
| 8,687,023 B2 | 4/2014 | Markiewicz et al. |
| 8,780,130 B2 * | 7/2014 | Morris .................. G06F 9/4443 345/173 |
| 8,830,270 B2 | 9/2014 | Zaman et al. |
| 8,869,027 B2 | 10/2014 | Louch et al. |
| 8,893,033 B2 | 11/2014 | Donahue et al. |
| 8,922,575 B2 | 12/2014 | Garside et al. |
| 8,935,631 B2 | 1/2015 | Leonard et al. |
| 8,954,871 B2 | 2/2015 | Louch et al. |
| 8,990,733 B2 | 3/2015 | Deutsch et al. |
| 8,992,323 B2 | 3/2015 | Kelly et al. |
| 9,032,318 B2 | 5/2015 | Louch et al. |
| 9,043,712 B2 | 5/2015 | Santoro et al. |
| 9,104,294 B2 | 8/2015 | Forstall et al. |
| 9,423,923 B1 | 8/2016 | Morris |
| 9,423,938 B1 | 8/2016 | Morris |
| 9,423,954 B2 | 8/2016 | Morris |
| 2001/0047404 A1 | 11/2001 | Suda |
| 2002/0007373 A1 | 1/2002 | Blair et al. |
| 2002/0019837 A1 | 2/2002 | Balnaves |
| 2002/0032659 A1 | 3/2002 | Waters |
| 2002/0035499 A1 | 3/2002 | Germeraad et al. |
| 2002/0042841 A1 | 4/2002 | Nishio et al. |
| 2002/0059076 A1 | 5/2002 | Grainger et al. |
| 2002/0070963 A1 | 6/2002 | Odero et al. |
| 2002/0077835 A1 | 6/2002 | Hagelin |
| 2002/0082778 A1 | 6/2002 | Barnett et al. |
| 2002/0093528 A1 | 7/2002 | Grainger |
| 2002/0111953 A1 | 8/2002 | Snyder |
| 2002/0147742 A1 | 10/2002 | Schroeder |
| 2002/0169743 A1 | 11/2002 | Arnold et al. |
| 2002/0184095 A1 | 12/2002 | Scullard et al. |
| 2002/0196272 A1 | 12/2002 | Ramos et al. |
| 2003/0016241 A1 | 1/2003 | Burke |
| 2003/0018609 A1 | 1/2003 | Phillips et al. |
| 2003/0033295 A1 | 2/2003 | Adler et al. |

(56) References Cited

U.S. PATENT DOCUMENTS

| | | |
|---|---|---|
| 2003/0036945 A1 | 2/2003 | Del Vecchio et al. |
| 2003/0046307 A1 | 3/2003 | Rivette et al. |
| 2003/0076352 A1 | 4/2003 | Uhlig et al. |
| 2003/0135820 A1 | 7/2003 | Aasman |
| 2003/0172020 A1 | 9/2003 | Davies et al. |
| 2004/0066414 A1 | 4/2004 | Czerwinski et al. |
| 2004/0181427 A1 | 9/2004 | Stobbs et al. |
| 2004/0193697 A1 | 9/2004 | Grosvenor et al. |
| 2004/0205537 A1 | 10/2004 | Graham et al. |
| 2004/0243938 A1 | 12/2004 | Weise et al. |
| 2005/0010876 A1 | 1/2005 | Robertson et al. |
| 2005/0059076 A1 | 3/2005 | Merkulov et al. |
| 2005/0193330 A1 | 9/2005 | Peters |
| 2005/0198584 A1 | 9/2005 | Matthews et al. |
| 2006/0015246 A1 | 1/2006 | Hui |
| 2006/0212795 A1 | 9/2006 | Cottrille et al. |
| 2006/0224992 A1 | 10/2006 | Rossi et al. |
| 2006/0271853 A1 | 11/2006 | Marcos et al. |
| 2006/0294130 A1 | 12/2006 | Soo et al. |
| 2006/0294470 A1 | 12/2006 | Marcos et al. |
| 2007/0234221 A1 | 10/2007 | Ishibashi |
| 2008/0109753 A1 | 5/2008 | Karstens |
| 2009/0044138 A1 | 2/2009 | Rudolph et al. |
| 2009/0063178 A1 | 3/2009 | Pousti et al. |
| 2009/0138819 A1 | 5/2009 | Yu |
| 2009/0164936 A1* | 6/2009 | Kawaguchi ........... G06F 3/0481 715/788 |
| 2009/0199128 A1 | 8/2009 | Matthews et al. |
| 2009/0228824 A1 | 9/2009 | Forstall et al. |
| 2009/0254610 A1 | 10/2009 | Arthursson |
| 2009/0300552 A1 | 12/2009 | Bollman et al. |
| 2009/0303242 A1 | 12/2009 | Kraut |
| 2010/0037154 A1 | 2/2010 | Marcos et al. |
| 2010/0169813 A1 | 7/2010 | Chang |
| 2010/0169814 A1 | 7/2010 | Zhang |
| 2010/0281372 A1 | 11/2010 | Lyons et al. |
| 2010/0299597 A1 | 11/2010 | Shin et al. |
| 2010/0302172 A1 | 12/2010 | Wilairat |
| 2011/0078733 A1* | 3/2011 | Lee ........................ G06F 3/0346 725/39 |
| 2011/0219330 A1 | 9/2011 | Ando |
| 2011/0231878 A1 | 9/2011 | Hunter et al. |
| 2011/0246904 A1* | 10/2011 | Pinto ..................... G06F 9/4445 715/740 |
| 2011/0302528 A1 | 12/2011 | Starr |
| 2012/0011437 A1 | 1/2012 | James |
| 2012/0023453 A1 | 1/2012 | Wagner |
| 2012/0036443 A1 | 2/2012 | Ohmori et al. |
| 2012/0072867 A1 | 3/2012 | Schlegel |
| 2012/0081302 A1* | 4/2012 | Gimpl ................... G06F 1/1616 345/173 |
| 2012/0084711 A1 | 4/2012 | Duarte |
| 2012/0084713 A1 | 4/2012 | Desai et al. |
| 2012/0096397 A1 | 4/2012 | Ording et al. |
| 2012/0154424 A1 | 6/2012 | Klotzer |
| 2012/0167011 A1 | 6/2012 | Zaman et al. |
| 2012/0304114 A1 | 11/2012 | Wong et al. |
| 2013/0047117 A1 | 2/2013 | Deutsch et al. |
| 2013/0063442 A1 | 3/2013 | Zaman et al. |
| 2013/0063490 A1 | 3/2013 | Zaman et al. |
| 2013/0198692 A1 | 8/2013 | Lin |
| 2013/0326401 A1 | 12/2013 | van Os |
| 2014/0136979 A1 | 5/2014 | Morotomi |
| 2014/0245142 A1 | 8/2014 | Dresti |
| 2015/0020101 A1 | 1/2015 | Brown |
| 2015/0040057 A1 | 2/2015 | Smuga |
| 2015/0128059 A1 | 5/2015 | Bakhash |
| 2015/0227283 A1 | 8/2015 | Luna |
| 2015/0331571 A1 | 11/2015 | Chaudhri |

FOREIGN PATENT DOCUMENTS

| | | |
|---|---|---|
| JP | 08190572 | 7/1996 |
| JP | 2002366797 | 12/2002 |
| WO | WO 97/17662 | 5/1997 |
| WO | WO 98/55945 | 12/1998 |
| WO | WO 00/11575 | 3/2000 |
| WO | 2000057281 A1 | 9/2000 |
| WO | WO 00/52618 | 9/2000 |
| WO | WO 00/60495 | 10/2000 |
| WO | WO 00/60496 | 10/2000 |
| WO | WO 00/75851 | 12/2000 |
| WO | WO 01/35277 | 5/2001 |
| WO | WO 01/54031 | 7/2001 |
| WO | WO 01/73657 | 10/2001 |
| WO | WO 01/84423 | 11/2001 |
| WO | WO 01/84424 | 11/2001 |
| WO | WO 01/84425 | 11/2001 |
| WO | WO 01/84426 | 11/2001 |
| WO | WO 02/05150 | 1/2002 |
| WO | WO 02/059147 | 8/2002 |
| WO | WO 02/086744 | 10/2002 |
| WO | WO 03/044718 | 5/2003 |

OTHER PUBLICATIONS

Richard Leadbetter, "Digital Foundry vs. Halo: Reach beta," available at http://www.eurogamer.net/articles/digitalfoundry-vs-halo-reach-beta-article?page=3 (posted on Jan. 5, 2010).

Jason Fitzpatrick, "Split Screen Slices Your Chrome Window into Two Panes," available at http://lifehacker.com/5511986/split-screen-slices-your-chrome-window-into-two-panes (posted on Apr. 8, 2010).

DonationCoder, "Grid Move," available at https://web.archive.org/web/20100208182814/http://jgpaiva.dcmembers.com/gridmove.html (posted on Feb. 8, 2010).

"100 open source gems—part 2," available at http://www.tuxradar.com/content/100-open-source-gems-part-2 (posted on May 21, 2009).

Homepage from "Splitview" website, available at https://web.archive.org/web/20090314055048/http://www.splitview.com/ (posted Mar 14, 2009).

Homepage from "Soulid Studio" website, available at https://web.archive.org/web/20100515190349/http://www.soulidstudio.com/ (posted May 15, 2010).

"Divvy for Mac OS X," available at https://web.archive.org/web/20100514104937/http://mizage.com/divvy (posted on May 14, 2010).

Nurgo Software, "AquaSnap," available at https://web.archive.org/web/20100330083810/http://www.nurgo-software.com/products/aquasnap (posted on Mar. 30, 2010).

Hompage to "Winsplit Revolution," available at https://web.archive.org/web/20091001024135/http://www.winsplit-revolution.com/ (posted on Oct. 1, 2009).

Google, "What is bug.n?," available at https://web.archive.org/web/20100326203241/http://code.google.com/p/bugn (posted on Mar. 26, 2010).

ZaneA, "HashTWM," available at https://web.archive.org/web/20100303233018/http://github.com/ZaneA/HashTWM (published Oct 25, 2009).

Homepage to "MaxTo," available at https://web.archive.org/web/20090522042853/http://www.maxto.net/ (posted May 22, 2009).

"Use Aero Snap with Internet Explorer 9 Tabs in Windows 7," available at http://www.howtogeek.com/howto/29090/use-aero-snap-with-ie-9-tabs-in-windows-7/ (posted Sep. 16, 2010).

Neowin, "WindowSpace v2.0 Beta—Snapping like in Windows 7," available at http://www.neowin.net/news/windowspace-v20-beta---snapping-like-in-windows-7 (posted Apr. 29, 2009).

"Xerox Star," available at https://web.archive.org/web/20100101040301/http://toastytech.com/guis/star.html (posted on Jan. 1, 2010).

Warren Teitelman, "Ten Years of Window Systems—A Retrospective View," available at https://web.archive.org/web/20100316102701/http://www.chilton-computing.org.uk/inf/literature/books/wm/p004.htm (posted on Mar. 10, 2010).

"Window tiling history," available at https://web.archive.org/web/20100330011025/http://mnemonikk.org/talks/tiling-wm.en.html (posted on Mar. 30, 2010).

(56) References Cited

OTHER PUBLICATIONS

"Comparison of tiling window managers," available at https://wiki.archlinux.org/index.php?title=Comparison_of_tiling_window_managers&oldid=112641 (posted on Jul. 26, 2010).
Jim Allchin, "The Sounds of Windows Vista," available at https://web.archive.org/web/20061110152317/http://windowsvistablog.com/blogs/windowsvista/archive/2006/11/09/the-sounds-of-windows-vista.aspx (posted on Nov. 9, 2006).
Long Zheng, "From Microsoft patent to Windows reality: "X-ray browsing", circa 2005; Aero Peek, circa 2008," available at http://www.istartedsomething.com/20081130/from-microsoft-patent-to-windows-reality-x-ray-browsing-aero-peek/ (posted on Nov. 30, 2008).
Steven Sinofsky, "Touching Windows 7," available at http://blogs.msdn.com/b/e7/archive/2009/03/25/touching-windows-7.aspx (posted on Mar. 25, 2009).
Kiriaty and Goldshtein, "Inside Windows 7—Introducing the Taskbar APIs," available at https://msdn.microsoft.com/en-us/magazine/dd942846.aspx (posted Jul. 2009).
Ina Fried, "Vista won't show fancy side to pirates," available at http://www.cnet.com/news/vista-wont-show-fancy-side-to-pirates/ (posted Apr. 14, 2006).
Klint Finley, "Microsoft Rolls Out Office Web Apps," available at http://readwrite.com/2010/06/08/microsoft-rolls-out-office-web (posted on Jun. 8, 2010).
Microsoft, "Microsoft to Extend Office to the Browser," available at http://news.microsoft.com/2008/10/28/microsoft-to-extend-office-to-the-browser/ (posted on Oct. 28, 2008).
Microsoft, "Microsoft Web Apps: Office Goes to the Web," available at http://news.microsoft.com/2009/09/17/microsoft-web-apps-office-goes-to-the-web/ (posted on Sep. 17, 2009).
Microsoft, "Microsoft Office 2010 Hits Major Milestone and Enters Technical Preview," available at http://news.microsoft.com/2009/07/13/microsoft-office-2010-hits-major-milestone-and-enters-technical-preview/ (posted on Jul. 13, 2009).
Ina Fried, "Next version of Office heads to the browser," available at http://www.cnet.com/news/next-version-of-office-heads-to-the-browser/ (posted on Apr. 9, 2009).
Sarah Perez, "Microsoft Office Web Applications: Your Burning Questions Answered," available at https://channel9.msdn.com/blogs/coolstuff/microsoft-office-web-applications-your-burning-questions-answered (posted on Nov. 10, 2008).
Microsoft Developer Network, "Object Binding Sample," Jul. 15, 2010, http://msdn.microsoft.com/en-us/library/8e36eeyx%28v=vs.90%29.aspx, last accessed Mar. 20, 2014.
Microsoft Developer Network, "Object Binding in Visual Studio," 2010, http://msdn.microsoft.com/en-us/library/ms233815(v=vs.100).aspx, last accessed Mar. 20, 2014.
Steven Sinofsky, "Designing Aero Snap," Mar. 17, 2009, https://blogs.msdn.microsoft.com/e7/2009/03/17/designing-aero-snap/#comments (last accesed Mar. 25, 2016).
Gina Trapani, "Snap Any Window to Half the Screen Size in Windows 7," Nov. 5, 2008, http://lifehacker.com/5077728/snap-any-window-to-half-the-screen-size-in-windows-7 (last accessed Mar. 25, 2016).
Seth Rosenblatt, "First Look: Touch-screen features in Windows 7," Jul. 17, 2009, http://www.cnet.com/videos/touch-screen-features-in-windows-7/ (last accessed Mar. 25, 2016.
www.open-ideas.org—Open Ideas, retrieved Apr. 6, 2001.
"Getting Started with PatentLab-II; a Sample Analysis Scenario Included", Wisdomain, Inc., Version 1.1, May 6, 2000.
Roberts, Bill, Solving the Value Equation, Knowledge management Magazine, Jan. 2001.
retrieved from the Internet Archive Wayback Machine Nov. 8, 2004.
retrieved from the Internet Archive Wayback Machine Nov. 22, 2004.
retrieved from the Internet Archive Wayback Machine Dec. 19, 2000.
retrieved from the Internet Archive Wayback Machine Jul. 6, 2000.
Microsoft press Computer Dictionary third Edition Microsoft Press, 1997.
Roberts, Ginger, Derwent Information Global Patent Sources, 1995.
East Search Screen Showing Copyright Date of 1999.
Dialog Pocket Guide, The Dialog Corporation, Copyright Date of 1998.
Dialog Pocket Guide, The Dialog Corporation, Copyright Date of 2001.
"Internet Explorer for Mac" screenshots http://en.wikipedia.org/wiki/Internet.sub.--Explorer.sub.--for.sub.--Mac., 2001.
Microsoft Internet Explorer Ver. 6.0.2800, Copyright 1995-2001.
Netscape Navigator v. 6.1, Released at least as early as Jun. 2001.
Internet Explorer 5.X Basics Release Date for IE 5.5 Jul. 12, 2000.
Internet Basics IE 5.5, p. 7: Release date for IE 5.5 Jul. 12, 2000.
Patricia Pantel, Dekang Lin, "A Statistical Corpus-Based Term Extractor" 2001.
Archived Webpages from Blink.com, 74 pages. (Feb. 2, 2009).
Archived Webpages from Clickmarks.com, 58 pages. (Oct. 5, 2008).
Archived Webpages from SpotOn.com, 74 pages. (Oct. 14, 2008).
Brs & West, Scientific and Technical information Center, USPTO, Jun. 1999, p. 4.
Chakrabarti, S. et al. (2000). "Using Memex to Archive and Mine Community Web Browsing Experience," Computer Networks 33:669-684.
East 1.1 Enhancements, Scientific and Technical Information Center, USPTO, Jul. 2000, pp. 5-86.
New Internet Explorer 5.5 Technologies Designed to Support Richer, Interactive Web Application (Jul. 12, 2000).
Pfaffenberger, B. (1995). Netscape Navigator 3.0, Surfing the Web and Exploring the Internet, AP Professional: Chestnut Hill, MA, pp. xv-xvi, 3, 5-12, 22, 76-84, 91-107, 201-209, 443.
SurfSaver.com Archived Webpages, 66 pages. (Feb. 19, 2009).
Underdahl, B. (2000). Opera Web Browser for Dummies, IDB Books Worldwide, Inc.: Foster City, CA, pp. 9-16, 28-32, 36-37, 40-42, 46-53, 67-93, 97, 152-153, 185-189.
Freedman, Alan, The Computer Desktop Encycloedia, AMACOM 1996.
Office Action Summary in U.S. Appl. No. 12/868,767 dated Dec. 31, 2012.
Office Action Summary in U.S. Appl. No. 12/868,767 dated Jul. 19, 2013.
Office Action Summary in U.S. Appl. No. 12/868,767 dated Jan. 16, 2014.
Office Action Summary in U.S. Appl. No. 14/173,806 dated Dec. 12, 2015.
Office Action Summary in U.S. Appl. No. 14/924,677, dated Feb. 3, 2016.
Office Action Summary in U.S. Appl. No. 12/956,008, dated Jul. 31, 2013.
Office Action Summary in U.S. Appl. No. 12/956,008, dated Mar. 27, 2014.
Office Action Summary in U.S. Appl. No. 14/331,096, dated Jan. 15, 2016.
Office Action Summary in U.S. Appl. No. 14/924,706, dated Jan. 20, 2016.
U.S. Appl. No. 12/868,767, filed Aug. 26, 2010.
Notice of Allowance in U.S. Appl. No. 14/924,706 dated May 11, 2016.
Notice of Allowance in U.S. Appl. No. 14/924,677 dated Jun. 13, 2016.
Notice of Allowance in U.S. Appl. No. 14/924,680 dated Jun. 20, 2016.
Microsoft Blog Post, "Windows Desktop Sharing API," Posted Mar. 8, 2007, available at https://blogs.technet.microsoft.com/enterprisemobility/2007/03/08/windows-desktop-sharing-api/.
Youtube Video and Transcript, "Intel Wireless Display Demo | Intel," Uploaded Jan. 10, 2010, available at https://www.youtube.com/watch?v=5Gm4ADoMFus.
Youtube Video and Transcript, "Office Live Meeting Demo 1: Join a meeting," Uploaded Jan. 8, 2008, available at https://www.youtube.com/watch?v=h9MYNKVg0W8.

(56) References Cited

OTHER PUBLICATIONS

CNET video, "Touch-screen features in Windows 7: CNET First Look" (Jul. 17, 2009), CNET Video Post, available at https://www.cnet.com/videos/touch-screen-features-in-windows-7/.
Steven Sinofsky, "Designing Aero Snap" (Mar. 17, 2009), Microsoft Blog Post, available at https://blogs.msdn.microsoft.com/e7/2009/03/17/designing-aero-snap/.
Gina Trapani, "Snap Any Window to Half the Screen Size in Windows 7" (Nov. 5, 2008), Lifehacker Blog Post, available at http://lifehacker.com/5077728/snap-any-window-to-half-the-screen-size-in-windows-7.
Office Action Summary from U.S. Appl. No. 14/924,709 dated Feb. 22, 2017.
Office Action Summary in U.S. Appl. No. 15/594,650 dated Jul. 10, 2017.
Office Action Summary in U.S. Appl. No. 14/173,806 dated Jun. 21, 2017.
Office Action Summary in U.S. Appl. No. 15/594,648 dated Jul. 14, 2017.
Office Action Summary in U.S. Appl. No. 15/594,649 dated Jul. 18, 2017.
Microsoft Windows 1.0 Operating Environment User's Guide (1985).
Microsoft Windows 7 Product Guide—"Welcome to Windows 7" (2009).

* cited by examiner

METHODS, SYSTEMS, AND COMPUTER PROGRAM PRODUCTS FOR BINDING ATTRIBUTES BETWEEN VISUAL COMPONENTS

RELATED APPLICATIONS

The present application is a continuation of, and claims priority to U.S. patent application Ser. No. 12/956,008, titled "METHODS, SYSTEMS, AND COMPUTER PROGRAM PRODUCTS FOR BINDING ATTRIBUTES BETWEEN VISUAL COMPONENTS," filed Nov. 30, 2010, the contents of which are incorporated herein by reference in their entirety for all purposes.

BACKGROUND

While some applications can be used alone, some applications are used together. Often there is no integration and/or cooperation between or among applications used at the same time by a user. Even in application suites, cooperation is limited to features that ease data sharing between or among applications in a particular application suite. For example, documents often include both text and media such as images from pictures, graphs, and drawings. Word processors provide rich feature sets for creating and editing text, but provide relatively weak or no features for creating and editing other forms of data. As a result, users work on text for a document in a word processor, images in an image editor, and drawings using a drawing tool such as a computer aided design (CAD) tool. Users spend significant time managing the user interfaces of these various applications in order to access the data desired in the application desired.

Accordingly, there exists a need for methods, systems, and computer program products for binding attributes between visual components.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods and systems are described for binding attributes between visual components. In one aspect, the method includes detecting a first visual component including a first presentation space for presenting first data by an operating first application. The method further includes identifying binding information, for the first application, that specifies a mapping between a first visual attribute of the first visual component and a second visual attribute of a second visual component including a second presentation space for presenting second data by a second application. The method still further includes detecting a first change to the first visual attribute. The method additionally includes, in response to detecting the first change, automatically sending change information to change the second visual attribute according to the mapping.

Further, a system for binding attributes between visual components is described. The system includes an execution environment including an instruction processing unit configured to process an instruction included in at least one of a user interface monitor component, a binding director component, a binding monitor component, and a change director component. The system includes the user interface monitor component configured for detecting a first visual component including a first presentation space for presenting first data by an operating first application. The system further includes the binding director component configured for identifying binding information, for the first application, that specifies a mapping between a first visual attribute of the first visual component and a second visual attribute of a second visual component including a second presentation space for presenting second data by a second application. The system still further includes the binding monitor component configured for detecting a first change to the first visual attribute. The system additionally includes the change director component configured for, in response to detecting the first change, automatically sending change information to change the second visual attribute according to the mapping.

BRIEF DESCRIPTION OF THE DRAWINGS

Objects and advantages of the present invention will become apparent to those skilled in the art upon reading this description in conjunction with the accompanying drawings, in which like reference numerals have been used to designate like or analogous elements, and in which.

DETAILED DESCRIPTION

Figure 1:
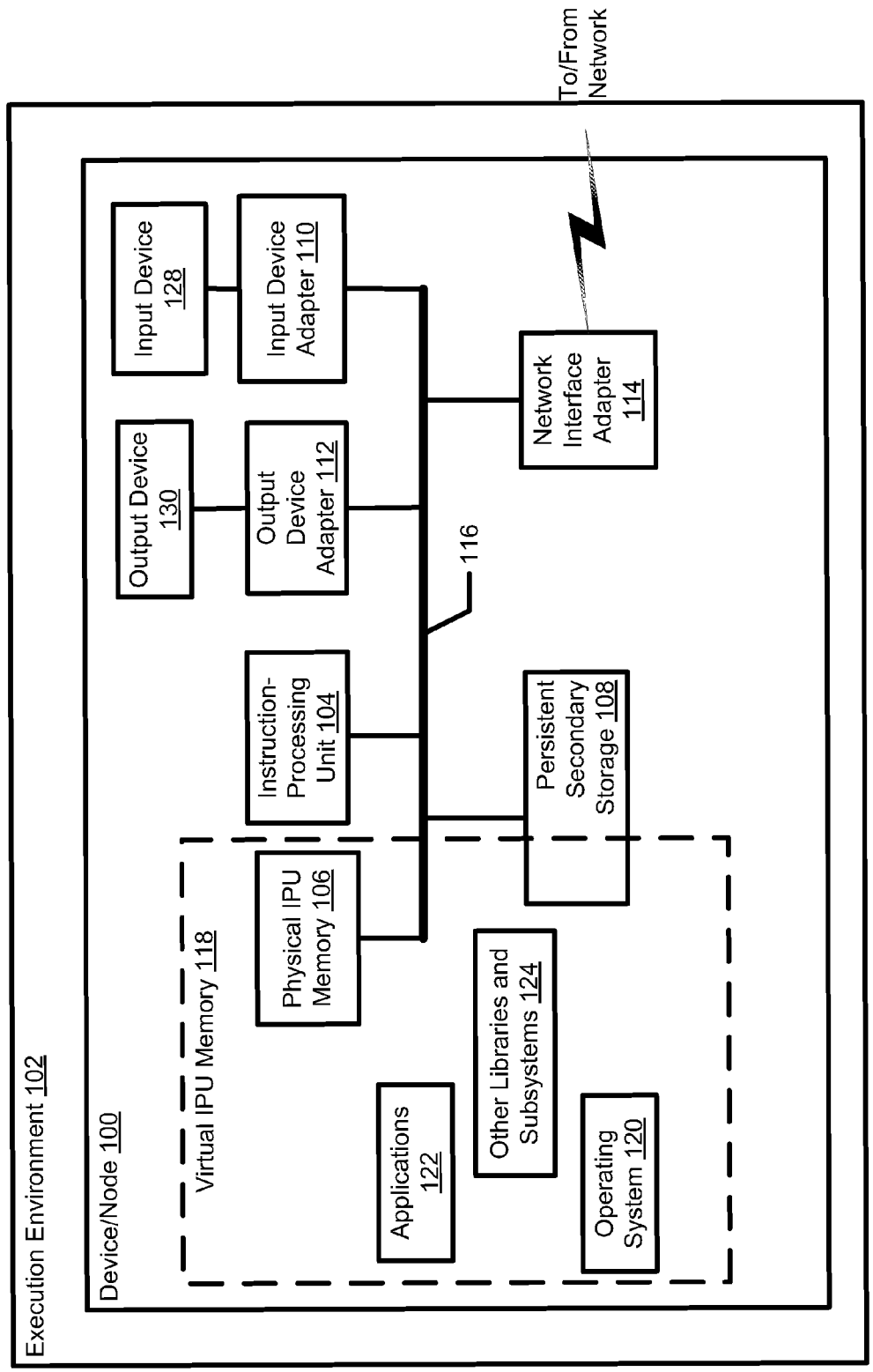
FIG. 1 is a block diagram illustrating an exemplary hardware device included in and/or otherwise providing an execution environment in which the subject matter may be implemented.

One or more aspects of the disclosure are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the disclosure. It may be evident, however, to one skilled in the art, that one or more aspects of the disclosure may be practiced with a lesser degree of these specific details. In other instances, well-known structures and devices are shown in block diagram form in order to facilitate describing one or more aspects of the disclosure.

An exemplary device included in an execution environment that may be configured according to the subject matter is illustrated in FIG. 1. An execution environment includes an arrangement of hardware and, optionally, software that may be further configured to include an arrangement of components for performing a method of the subject matter described herein. An execution environment includes and/or is otherwise provided by one or more devices. An execution environment may include a virtual execution environment including software components operating in a host execution environment. Exemplary devices included in or otherwise providing suitable execution environments for configuring according to the subject matter include personal computers, notebook computers, tablet computers, servers, handheld and other mobile devices, multiprocessor devices, distributed devices and/or systems, consumer electronic devices, routers, communication servers, and/or other network-enabled devices. Those skilled in the art will understand that the components illustrated in FIG. 1 are exemplary and may vary by particular execution environment.

FIG. 1 illustrates hardware device 100 included in execution environment 102. FIG. 1 illustrates that execution environment 102 includes instruction-processing unit (IPU) 104, such as one or more microprocessors; physical IPU memory 106 including storage locations identified by addresses in a physical memory address space of IPU 104; persistent secondary storage 108, such as one or more hard drives and/or flash storage media; input device adapter 110, such as a key or keypad hardware, a keyboard adapter, and/or a mouse adapter; output device adapter 112, such as a display and/or an audio adapter for presenting information to a user; a network interface component, illustrated by network interface adapter 114, for communicating via a network such as a LAN and/or WAN; and a communication mechanism that couples elements 104-114, illustrated as bus 116. Elements 104-114 may be operatively coupled by various means. Bus 116 may comprise any type of bus architecture, including a memory bus, a peripheral bus, a local bus, and/or a switching fabric.

IPU 104 is an instruction-execution machine, apparatus, or device. Exemplary IPUs include one or more microprocessors, digital signal processors (DSPs), graphics processing units, application-specific integrated circuits (ASICs), and/or field programmable gate arrays (FPGAs). In the description of the subject matter herein, the terms "IPU" and "processor" are used interchangeably. IPU 104 may access machine code instructions and data via one or more memory address spaces in addition to the physical memory address space. A memory address space includes addresses identifying locations in a processor memory. The addresses in a memory address space are included in defining a processor memory. IPU 104 may have more than one processor memory. Thus, IPU 104 may have more than one memory address space. IPU 104 may access a location in a processor memory by processing an address identifying the location. The processed address may be in an operand of a machine code instruction and/or may be identified in a register or other portion of IPU 104.

FIG. 1 illustrates virtual IPU memory 118 spanning at least part of physical IPU memory 106 and at least part of persistent secondary storage 108. Virtual memory addresses in a memory address space may be mapped to physical memory addresses identifying locations in physical IPU memory 106. An address space for identifying locations in a virtual processor memory is referred to as a virtual memory address space; its addresses are referred to as virtual memory addresses; and its IPU memory is referred to as a virtual IPU memory or virtual memory. The terms "IPU memory" and "processor memory" are used interchangeably herein. Processor memory may refer to physical processor memory, such as IPU memory 106, and/or may refer to virtual processor memory, such as virtual IPU memory 118, depending on the context in which the term is used.

Physical IPU memory 106 may include various types of memory technologies. Exemplary memory technologies include static random access memory (SRAM) and/or dynamic RAM (DRAM) including variants such as dual data rate synchronous DRAM (DDR SDRAM), error correcting code synchronous DRAM (ECC SDRAM), and/or RAMBUS DRAM (RDRAM). Physical IPU memory 106 may include volatile memory as illustrated in the previous sentence and/or may include nonvolatile memory such as nonvolatile flash RAM (NVRAM) and/or ROM.

Persistent secondary storage 108 may include one or more flash memory storage devices, one or more hard disk drives, one or more magnetic disk drives, and/or one or more optical disk drives. Persistent secondary storage may include removable media. The drives and their associated computer-readable storage media provide volatile and/or nonvolatile storage for computer-readable instructions, data structures, program components, and other data for execution environment 102.

Execution environment 102 may include software components stored in persistent secondary storage 108, in remote storage accessible via a network, and/or in a processor memory. FIG. 1 illustrates execution environment 102 including operating system 120, one or more applications 122, and other program code and/or data components illustrated by other libraries and subsystems 124. In an aspect, some or all software components may be stored in locations accessible to IPU 104 in a shared memory address space shared by the software components. The software components accessed via the shared memory address space are stored in a shared processor memory defined by the shared memory address space. In another aspect, a first software component may be stored in one or more locations accessed by IPU 104 in a first address space and a second software component may be stored in one or more locations accessed by IPU 104 in a second address space. The first software component is stored in a first processor memory defined by the first address space and the second software component is stored in a second processor memory defined by the second address space.

Software components typically include instructions executed by IPU 104 in a computing context referred to as a "process". A process may include one or more "threads". A "thread" includes a sequence of instructions executed by IPU 104 in a computing sub-context of a process. The terms "thread" and "process" may be used interchangeably herein when a process includes only one thread.

Execution environment 102 may receive user-provided information via one or more input devices illustrated by input device 128. Input device 128 provides input information to other components in execution environment 102 via input device adapter 110. Execution environment 102 may include an input device adapter for a keyboard, a touch screen, a microphone, a joystick, a television receiver, a video camera, a still camera, a document scanner, a fax, a phone, a modem, a network interface adapter, and/or a pointing device, to name a few exemplary input devices.

Input device 128 included in execution environment 102 may be included in device 100 as FIG. 1 illustrates or may be external (not shown) to device 100. Execution environment 102 may include one or more internal and/or external input devices. External input devices may be connected to device 100 via corresponding communication interfaces such as a serial port, a parallel port, and/or a universal serial bus (USB) port. Input device adapter 110 receives input and provides a representation to bus 116 to be received by IPU 104, physical IPU memory 106, and/or other components included in execution environment 102.

Output device 130 in FIG. 1 exemplifies one or more output devices that may be included in and/or may be external to and operatively coupled to device 100. For example, output device 130 is illustrated connected to bus 116 via output device adapter 112. Output device 130 may be a display device. Exemplary display devices include liquid crystal displays (LCDs), light emitting diode (LED) displays, and projectors. Output device 130 presents output of execution environment 102 to one or more users. In some embodiments, an input device may also include an output device. Examples include a phone, a joystick, and/or a touch screen. In addition to various types of display devices, exemplary output devices include printers, speakers, tactile output devices such as motion-producing devices, and other output devices producing sensory information detectable by a user.

A device included in or otherwise providing an execution environment may operate in a networked environment communicating with one or more devices via one or more network interface components. The terms "communication interface component" and "network interface component" are used interchangeably herein. FIG. 1 illustrates network interface adapter (NIA) 114 as a network interface component included in execution environment 102 to operatively couple device 100 to a network. A network interface component includes a network interface hardware (NIH) component and optionally a software component. The terms "network node" and "node" in this document both refer to a device having a network interface component for operatively coupling the device to a network.

Exemplary network interface components include network interface controller components, network interface cards, network interface adapters, and line cards. A node may include one or more network interface components to interoperate with a wired network and/or a wireless network. Exemplary wireless networks include a BLUETOOTH network, a wireless 802.11 network, and/or a wireless telephony network (e.g., a cellular, PCS, CDMA, and/or GSM network). Exemplary network interface components for wired networks include Ethernet adapters, Token-ring adapters, FDDI adapters, asynchronous transfer mode (ATM) adapters, and modems of various types. Exemplary wired and/or wireless networks include various types of LANs, WANs, and/or personal area networks (PANs). Exemplary networks also include intranets and internets such as the Internet.

The terms "device" and "node" as used herein refer to one or more devices and nodes, respectively, providing and/or otherwise included in an execution environment unless clearly indicated otherwise.

The components of a user interface are generically referred to herein as user interface elements. More specifically, visual components of a user interface are referred to herein as visual interface elements. A visual interface element may be a visual component of a graphical user interface (GUI). Exemplary visual interface elements include windows, textboxes, sliders, list boxes, drop-down lists, spinners, various types of menus, toolbars, ribbons, combo boxes, tree views, grid views, navigation tabs, scrollbars, labels, tooltips, text in various fonts, balloons, dialog boxes, and various types of button controls including check boxes and radio buttons. An application interface may include one or more of the elements listed. Those skilled in the art will understand that this list is not exhaustive. The terms "visual representation", "visual component", and "visual interface element" are used interchangeably in this document. Other types of user interface elements include audio output components referred to as audio interface elements, tactile output components referred to as tactile interface elements, and the like.

A visual component may be presented in a two-dimensional presentation where a location may be defined in a two-dimensional space having a vertical dimension and a horizontal dimension. A location in a horizontal dimension may be referenced according to an X-axis and a location in a vertical dimension may be referenced according to a Y-axis. In another aspect, a visual component may be presented in a three-dimensional presentation where a location may be defined in a three-dimensional space having a depth dimension in addition to a vertical dimension and a horizontal dimension. A location in a depth dimension may be identified according to a Z-axis. A visual component in a two-dimensional presentation may be presented as if a depth dimension existed, allowing the visual component to overlie and/or underlie some or all of another visual component.

An order of visual components in a depth dimension is herein referred to as a "Z-order". The term "Z-value" as used herein refers to a location in a Z-order, or an order of visual components along a Z-axis. A Z-order specifies the front-to-back ordering of visual components in a presentation space. A visual component with a higher Z-value than another visual component may be defined as being on top of or closer to the front than the other visual component.

A "user interface (UI) element handler" component, as the term is used in this document, includes a component configured to send information representing a program entity for presenting a user-detectable representation of the program entity by an output device, such as a display. A "program entity" is an object included in and/or otherwise processed by an application or executable program component. The user-detectable representation is presented based on the sent information. The sent information is referred to herein as "presentation information". Presentation information may include data in one or more formats. Exemplary formats include image formats such as JPEG, video formats such as MP4, markup language data such as HTML and other XML-based markup, and/or instructions such as those defined by various script languages, byte code, and/or machine code. For example, a web page received by a browser from a remote application provider may include hypertext markup language (HTML), ECMAScript, and/or byte code for presenting one or more user interface elements included in a user interface of the remote application.

Components configured to send information representing one or more program entities for presenting particular types of output by particular types of output devices include visual interface element handler components, audio interface element handler components, tactile interface element handler components, and the like.

A representation of a program entity may be stored and/or otherwise maintained in a presentation space. As used in this document, the term "presentation space" refers to a storage region allocated and/or otherwise provided for storing presentation information, which may include audio, visual, tactile, and/or other sensory data for presentation by and/or on an output device. For example, a buffer for storing an image and/or text string may be a presentation space. A presentation space may be physically and/or logically contiguous or non-contiguous. A presentation space may have a virtual as well as a physical representation. A presentation space may include a storage location in a processor memory, secondary storage, a memory of an output adapter device, and/or a storage medium of an output device. A screen of a display, for example, includes a presentation space.

As used herein, the term "program" or "executable" refers to any data representation that may be translated into a set of machine code instructions and optionally associated program data. Thus, a program component or executable component may include an application, a shared or non-shared library, and a system command. Program representations other than machine code include object code, byte code, and source code. Object code includes a set of instructions and/or data elements that either are prepared for linking prior to loading or are loaded into an execution environment. When in an execution environment, object code may include references resolved by a linker and/or may include one or more unresolved references. The context in which this term is used will make clear that state of the object code when it is relevant. This definition can include machine code and virtual machine code, such as Java™ byte code.

As used herein, an "addressable entity" is a portion of a program, specifiable in programming language in source code. An addressable entity is addressable in a program component translated from the source code in a compatible execution environment. Examples of addressable entities include variables, constants, functions, subroutines, procedures, modules, methods, classes, objects, code blocks, and labeled instructions. A code block includes one or more instructions in a given scope specified in a programming language. An addressable entity may include a value. In some places in this document "addressable entity" refers to a value of an addressable entity. In these cases, the context will clearly indicate that the value is being referenced.

Addressable entities may be written in and/or translated to a number of different programming languages and/or representation languages, respectively. An addressable entity may be specified in and/or translated into source code, object code, machine code, byte code, and/or any intermediate language(s) for processing by an interpreter, compiler, linker, loader, and/or analogous tool.

Figure 2:
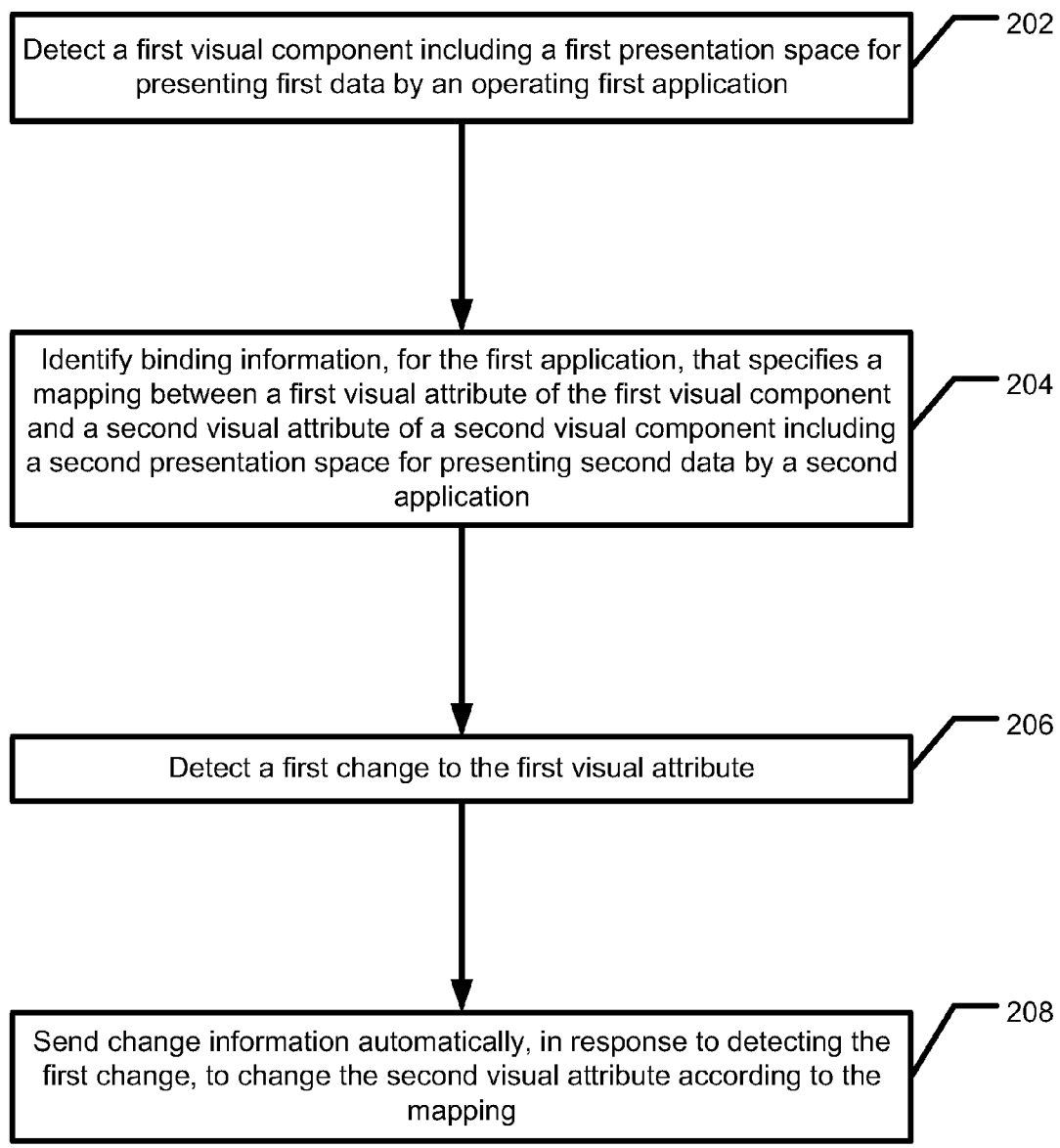
FIG. 2 is a flow diagram illustrating a method for binding attributes between visual components according to an aspect of the subject matter described herein.
Figure 3:
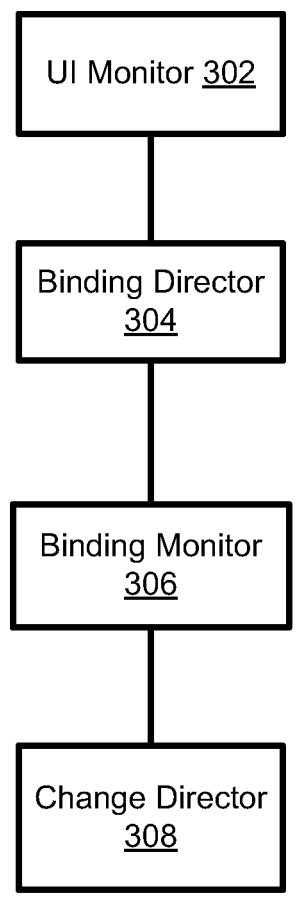
FIG. 3 is a block diagram illustrating an arrangement of components for binding attributes between visual components according to another aspect of the subject matter described herein.

The block diagram in FIG. 3 illustrates an exemplary system for binding attributes between visual components according to the method illustrated in FIG. 2. FIG. 3 illustrates a system, adapted for operation in an execution environment, such as execution environment 102 in FIG. 1, for performing the method illustrated in FIG. 2. The system illustrated includes a user interface monitor component 302, a binding director component 304, a binding monitor component 306, and a change director component 308. The execution environment includes an instruction-processing unit, such as IPU 104, for processing an instruction in at least one of the user interface monitor component 302, the binding director component 304, the binding monitor component 306, and the change director component 308. Some or all of the exemplary components illustrated in FIG. 3 may be adapted for performing the method illustrated in FIG. 2 in a number of execution environments. FIGS. 4a-d include block diagrams illustrating the components of FIG. 3 and/or analogs of the components of FIG. 3 adapted for operation in various execution environments 401 including or otherwise provided by one or more devices and/or nodes.

FIG. 1 illustrates components of an exemplary device that may at least partially provide and/or otherwise be included in an execution environment. The components illustrated in FIGS. 4a-d may be included in or otherwise combined with the components of FIG. 1 to create a variety of arrangements of components according to the subject matter described herein.

Figure 4A:
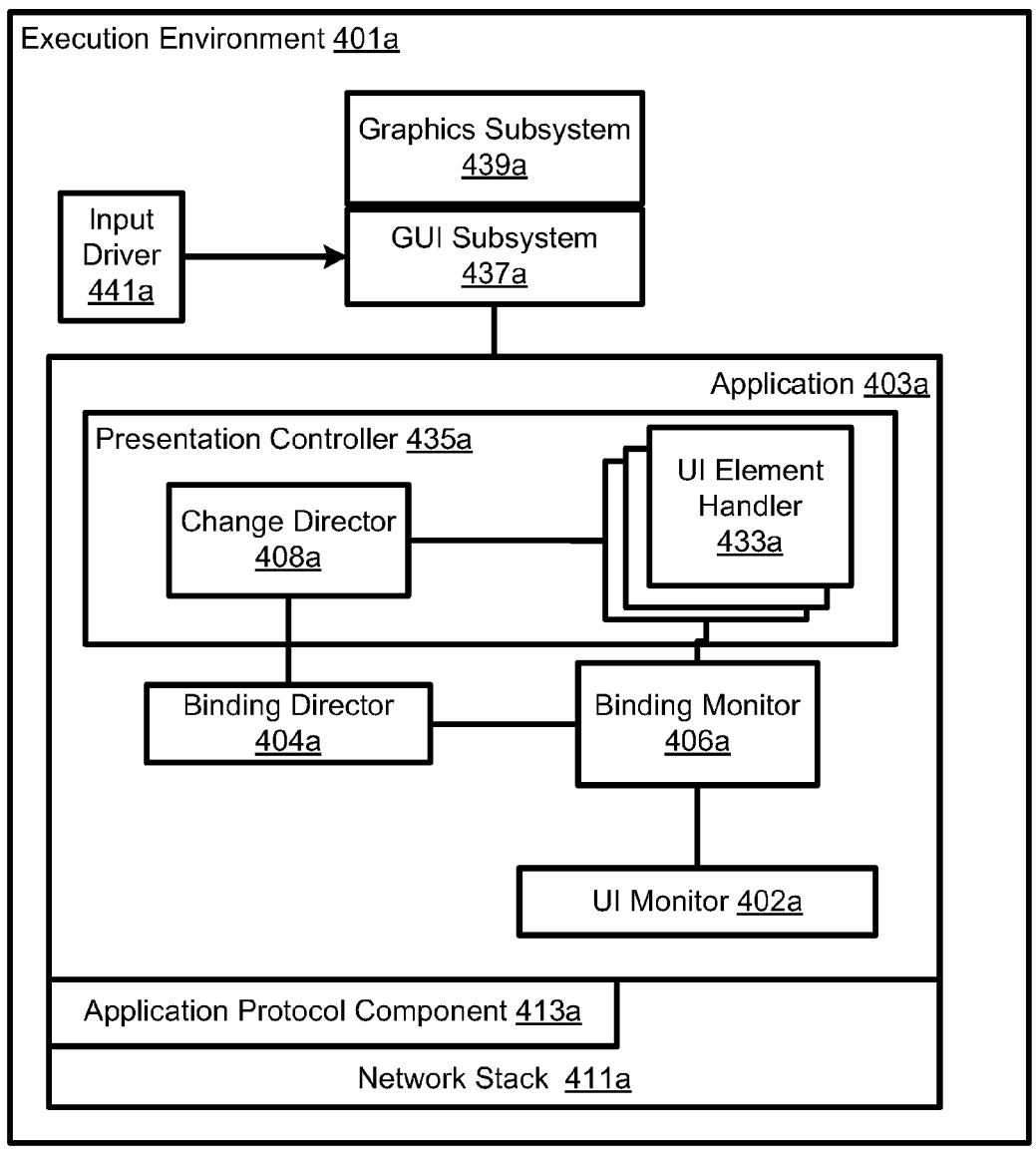
FIG. 4a is a block diagram illustrating an arrangement of components for binding attributes between visual components according to another aspect of the subject matter described herein.
Figure 4B:
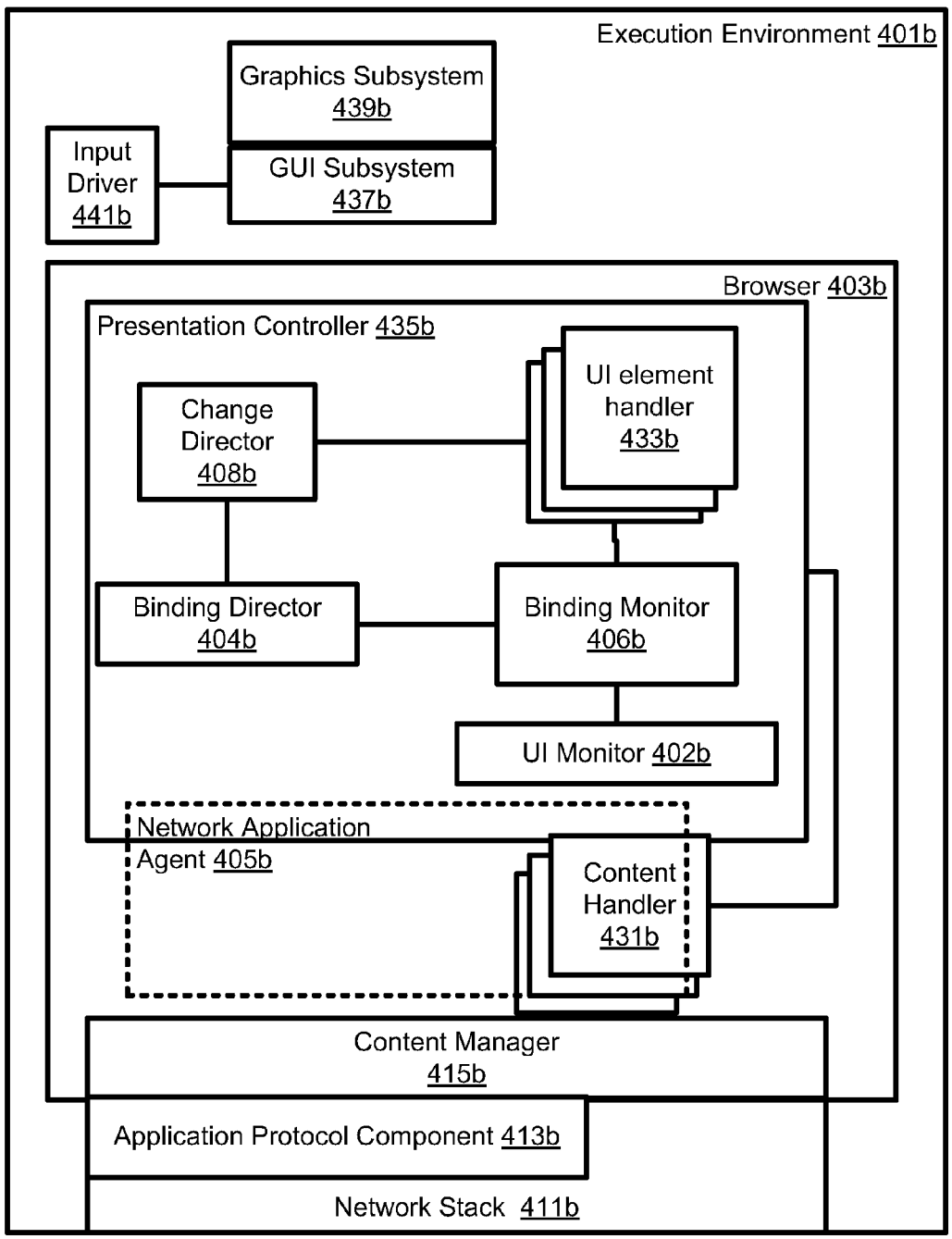
FIG. 4b is a block diagram illustrating an arrangement of components for binding attributes between visual components according to another aspect of the subject matter described herein.
Figure 4C:
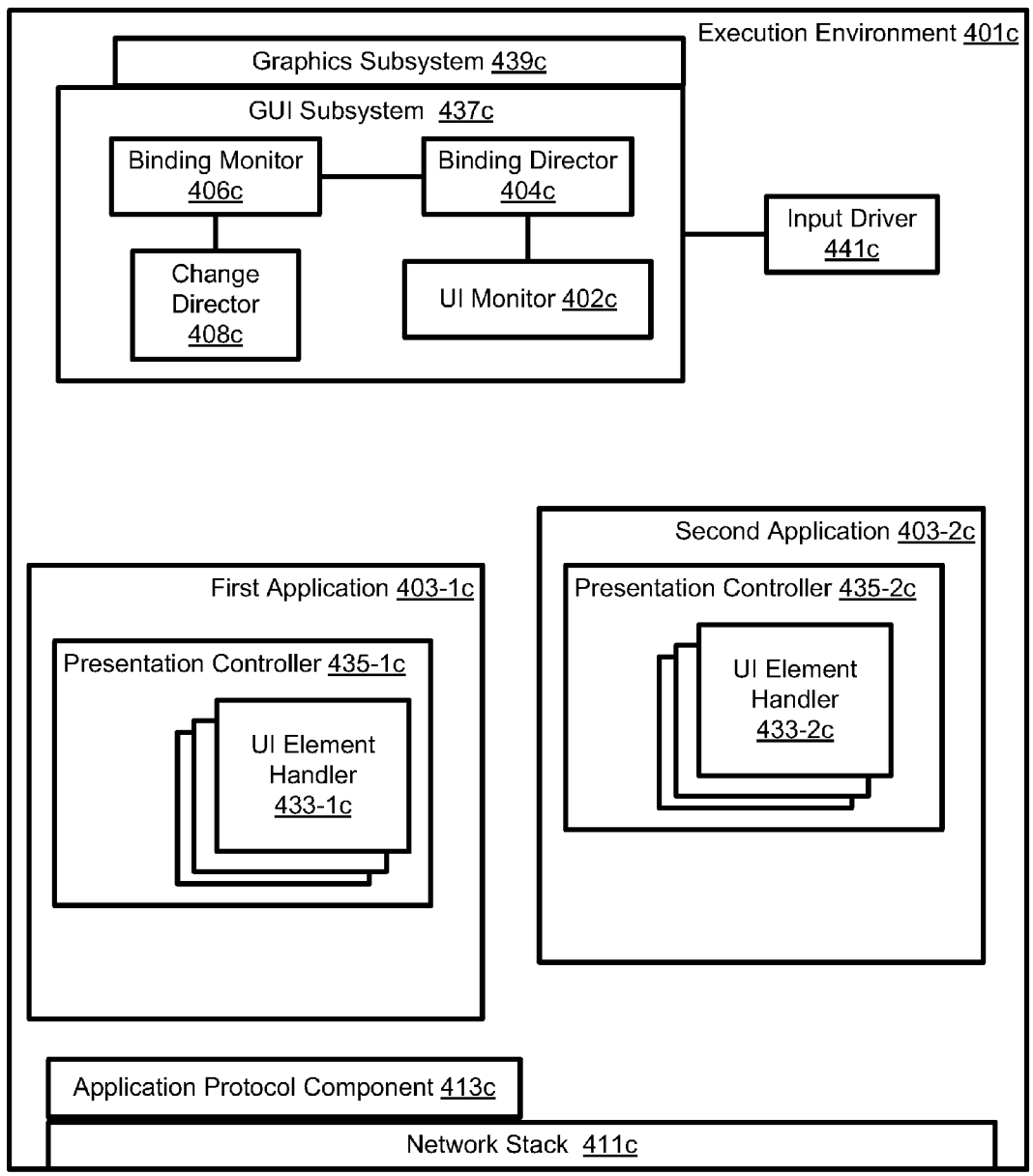
FIG. 4c is a block diagram illustrating an arrangement of components for binding attributes between visual components according to another aspect of the subject matter described herein.
Figure 4D:
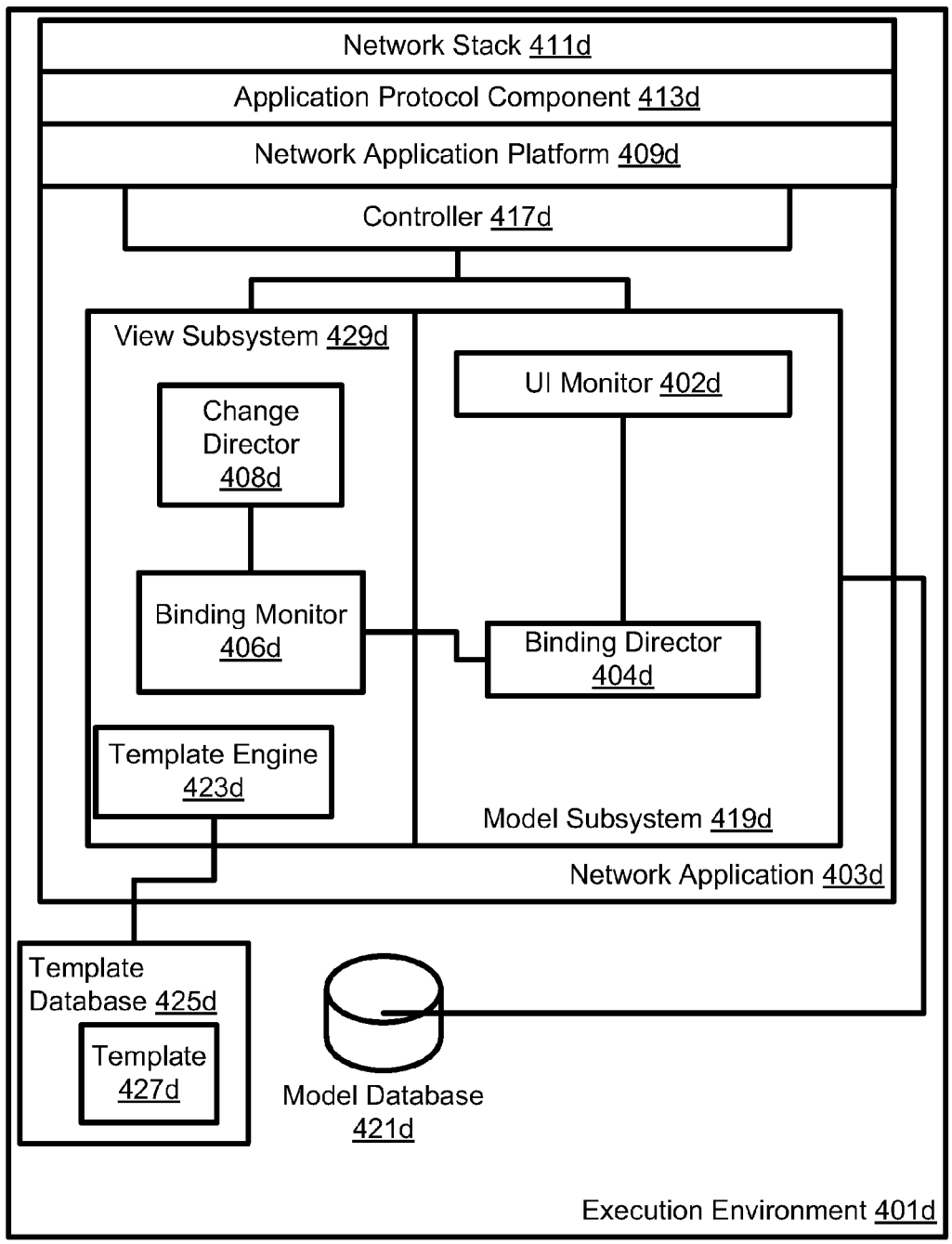
FIG. 4d is a block diagram illustrating an arrangement of components for binding attributes between visual components according to another aspect of the subject matter described herein.
Figure 5:
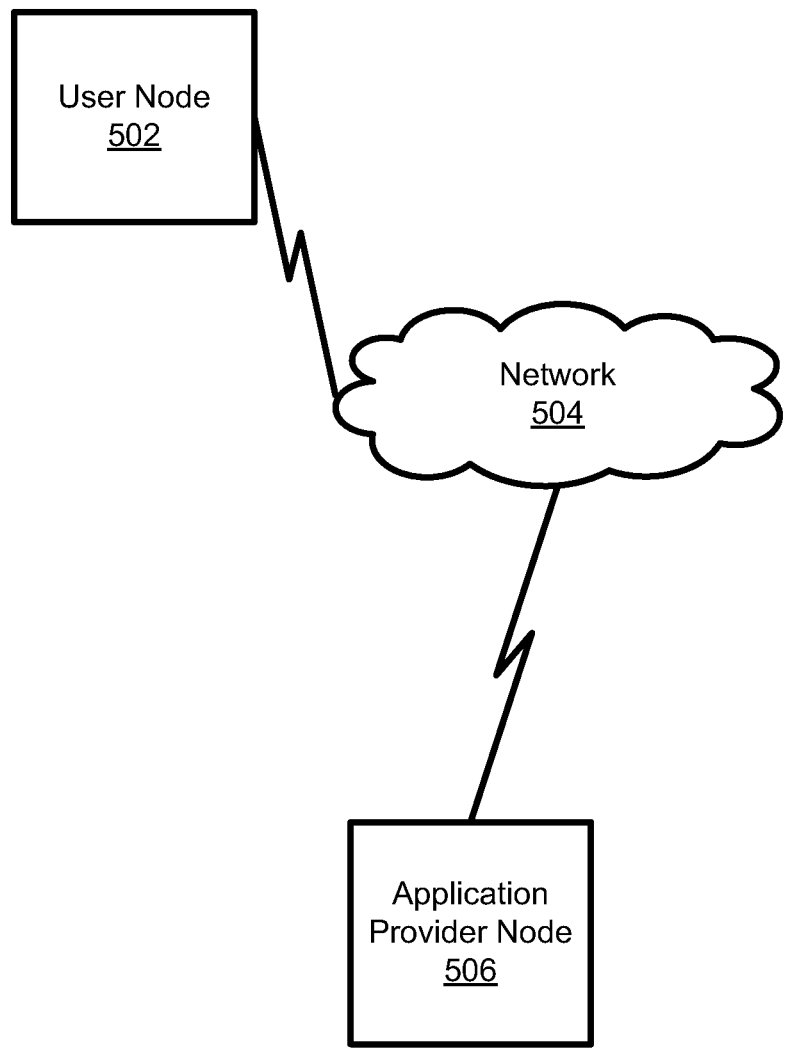
FIG. 5 is a network diagram illustrating an exemplary system for binding attributes between visual components according to another aspect of the subject matter described herein.

FIG. 5 illustrates user node 502 as an exemplary device that in various aspects may be included in and/or otherwise adapted for providing any of execution environments 401 illustrated in FIGS. 4a-c each illustrating a different adaptation of the arrangement of components in FIG. 3. As illustrated in FIG. 5, user node 502 is operatively coupled to network 504 via a network interface component, such as network interface adapter 114. Alternatively or additionally, an adaptation of an execution environment 401 may include and/or may otherwise be provided by a device that is not operatively coupled to a network. A server device is illustrated by application provider node 506. Application provider node 506 may be included in and/or otherwise adapted for providing execution environment 401d illustrated in FIG. 4d. As illustrated in FIG. 5, application provider node 506 is operatively coupled to network 504 via a network interface component included in execution environment 401d.

FIG. 4a illustrates execution environment 401a hosting application 403a including an adaptation of the arrangement of components in FIG. 3. FIG. 4b illustrates execution environment 401b hosting browser 403b including an adaptation of the arrangement of components in FIG. 3 that may operate at least partially in a network application agent 405b received from a remote application provider, such as network application 403d in FIG. 4d. Browser 403b and execution environment 401b may provide at least part of an execution environment for network application agent 405b that may be received via a network from a network application operating in a remote execution environment. FIG. 4c illustrates an arrangement of the components in FIG. 3 adapted to operate in GUI subsystem 437c of execution environment 401c. The arrangement in FIG. 4c may mediate communication between applications 403c and one or more output devices, such as display 130 in FIG. 1.

FIG. 4d illustrates execution environment 401d configured to host one or more network applications, such as a web service, illustrated by network application 403d. FIG. 4d also illustrates network application platform 409d that may provide services to one or more network applications. Network application 403d includes yet another adaptation of the arrangement of components in FIG. 3.

The various adaptations of the arrangement in FIG. 3 are not exhaustive. For example, those skilled in the art will see based on the description herein that arrangements of components for performing the method illustrated in FIG. 2 may be at least partially included in an application and at least partially external to the application. Further, arrangements for performing the method illustrated in FIG. 2 may be distributed across more than one node and/or execution environment. For example, such an arrangement may operate at least partially in browser 403b in FIG. 4b and at least partially in execution environment 401d in and/or external to network application 403d in FIG. 4d.

FIGS. 4a-d illustrate adaptations of network stacks 411 configured for sending and receiving messages over a network, such as network 504, via a network interface component. Network application platform 409d in FIG. 4d provides services to one or more network applications. In various aspects, network application platform 409d may include and/or interoperate with a web server. FIG. 4d also illustrates network application platform 409d configured for interoperating with network stack 411d. Network stacks 411 may support the same protocol suite, such as TCP/IP, or may communicate via a network gateway or other protocol translation device and/or service. For example, browser 403b in FIG. 4b and network application platform 409d in FIG. 4d may interoperate via their respective network stacks: network stack 411b and network stack 411d.

FIGS. 4a-d respectively illustrate applications 403 that may communicate via one or more application layer protocols. FIGS. 4a-d respectively illustrate application protocol components 413 for communicating via one or more application layer protocols. Exemplary application protocols include hypertext transfer protocol (HTTP) and instant messaging and presence (XMPP-IM) protocol. Matching protocols enabling applications 403 to communicate via network 504 in FIG. 5 are not required, if communication is via a protocol gateway or other protocol translator.

In FIG. 4b, browser 403b may receive some or all of network application agent 405b in one or more messages sent from a network application, such as network application 403d via network application platform 409d, a network stack 411, a network interface component, and optionally an application protocol component 413. In FIG. 4b, browser 403b includes content manager component 415b. Content manager component 415b may interoperate with one or more of application protocol components 413b and/or network stack 411b to receive the message or messages including some or all of network application agent 405b.

Network application agent 405b may include a web page for presenting a user interface for network application 403d. The web page may include and/or reference data represented in one or more formats including HTML and/or other markup language, ECMAScript or other scripting language, byte code, image data, audio data, and/or machine code.

In an example, in response to a request received from browser 403b in FIG. 4b operating in user node 502 in FIG. 5, controller component 417d, in FIG. 4d, operating in application provider node 506 may invoke model subsystem 419d to perform request-specific processing. Model subsystem 419d may include any number of request handlers (not shown) for dynamically generating data and/or retrieving data from model database 421d based on the request. Controller component 417d may further invoke template engine component 423d to identify one or more templates and/or static data elements for generating a user interface for representing a response to the received request. FIG. 4d illustrates template database 425d including exemplary template 427d. FIG. 4d illustrates template engine 423d as a component in view subsystem 429d configured to return responses to processed requests in a presentation format suitable for a client, such as browser 403b. View subsystem 429d may provide the presentation data to controller component 417d to send to browser 403b in response to the request received from browser 403b. Some or all of network application agent 405b may be sent to browser 403b via network application platform 409d as described above.

While the example describes sending some or all of network application agent 405b in response to a request, network application 403d additionally or alternatively may send some or all of a network application agent to browser 403b via one or more asynchronous messages. In an aspect, an asynchronous message may be sent in response to a change detected by network application 403d. Publish-subscribe protocols, such as the presence protocol specified by XMPP-IM, are exemplary protocols for sending messages asynchronously.

The one or more messages including information representing some or all of network application agent 405b in FIG. 4b may be received by content manager component 415b via one or more of application protocol component(s) 413b and network stack 411b as described above. In FIG. 4b, browser 403b includes one or more content handler components 431b to process received data according to its data type, typically identified by a MIME-type identifier. Exemplary content handler components 431b include a text/html content handler component for processing HTML documents; an application/xmpp-xml content handler component for processing XMPP streams including presence tuples, instant messages, and publish-subscribe data as defined by various XMPP specifications; one or more video content handler components for processing video streams of various types; and still image data content handler components for processing various images types. Content handler components 431b process received data and may provide a representation of the processed data to one or more user interface (UI) element handler components 433b.

UI element handler components 433 are illustrated in presentation controller components 435 in FIG. 4a, FIG. 4b, and FIG. 4c. A presentation controller component 435 may manage the visual, audio, and/or other types of output of its including application 403 as well as receive and route detected user and other inputs to components and extensions of its including application 403. With respect to FIG. 4b, a UI element handler component 433b in various aspects may be adapted to operate at least partially in a content handler component 431b such as a text/html content handler component and/or a script content handler component. Additionally or alternatively, a UI element handler component 433 in an execution environment 401 may operate in and/or as an extension of its including application 403. For example, a plug-in may provide a virtual machine, for a UI element handler component received as a script and/or byte code, that may operate as an extension in application 403 and/or external to and interoperating with application 403.

Figure 6A:
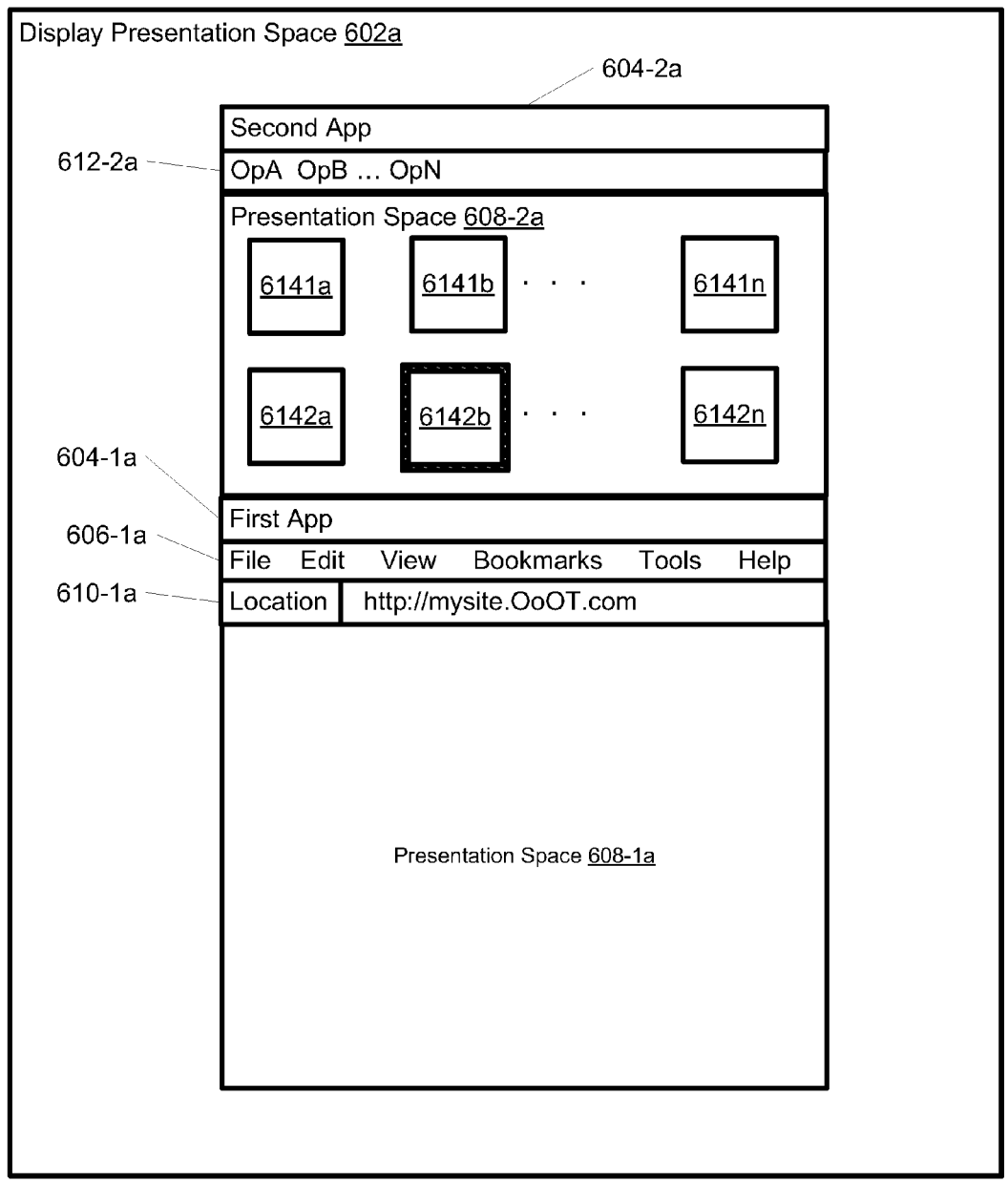
FIG. 6a is a diagram illustrating a user interface presented via a display according to another aspect of the subject matter described herein.
Figure 6B:
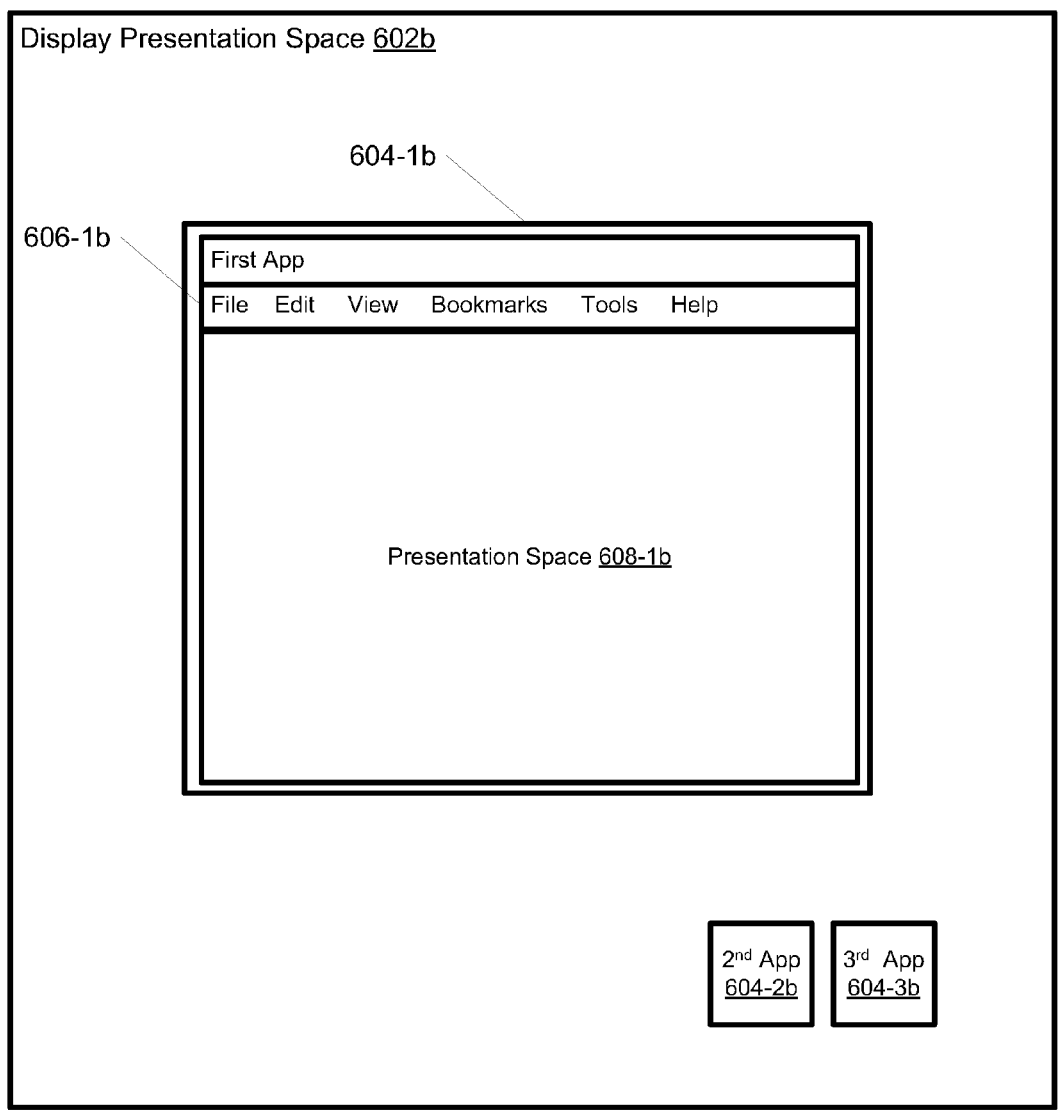
FIG. 6b is a diagram illustrating a user interface presented via a display according to another aspect of the subject matter described herein.

FIGS. 6a-b respectively illustrate display presentation spaces 602 of a display in and/or operatively coupled to a device. FIGS. 6a-b illustrate first app visual components 604-1 and second app visual components 604-2 in respective presentation spaces 602. The various app visual components 604 illustrated in FIGS. 6a-b are described as user interfaces of various applications 403 and other components illustrated in FIGS. 4a-d as required in describing the subject matter herein. An app visual component 604 may be provided as a user interface of multiple applications interoperating. For example, an app visual component 604 and/or a visual component included in an app visual component 604 may be presented via interoperation of browser 403b, network application agent 405b, and network application 403d illustrated in FIG. 4b and FIG. 4d. Browser 403b may operate in user node 502, and network application 403d may operate in application provider node 506. Network application agent 405*b* may be provided to user node 502 by application provider node 506 via network 504, as described above.

Various UI elements of applications 403 described above may be presented by one or more UI element handler components 433 in FIGS. 4*a-c* and/or by one or more template engines 423*d* in FIG. 4*d*. In an aspect, illustrated in FIGS. 4*a*-4*c*, UI element handler component(s) 433 of one or more applications 403 is/are configured to send representation information representing a visual interface element, such as operation bar 612-2*a* in FIG. 6*a*, to a GUI subsystem 437. A GUI subsystem 437 may instruct a corresponding graphics subsystem 439 to draw the visual interface element in a region of display presentation space 602*a*, based on presentation information received from a corresponding UI element handler component 433.

Input may be received corresponding to a UI element via an input driver 441 illustrated in FIGS. 4*a-c* in various adaptations. For example, a user may move a mouse to move a pointer presented in display presentation space 602*a* in FIG. 6*a* over an operation user interface element presented in an operation bar 612-2*a*. A user may provide an input detected by the mouse. The detected input may be received by a GUI subsystem 437 via an input driver 441 as an operation or command indicator based on the association of the shared location of the pointer and the operation user interface element in display presentation space 602*a*.

In FIGS. 6*a-b*, first app visual components 604-1 and second app visual components 604-2 are collectively and generically referred to as app visual components(s) 604. App visual components 604 in FIGS. 6*a-b* illustrate a number of visual user interface elements commonly found in application user interfaces. Menu bars 606-1 are illustrated in first app visual components 604-1 in FIGS. 6*a-b*. Menu bars 606-1 are illustrated including menu controls for receiving user input to identify commands to perform. App visual components 604 also illustrate user interface elements providing respective application presentation spaces 608 for presenting content including other visual components illustrated by resource user interface elements 6141*a* through 6142*n* in FIG. 6*a* representing respective resources.

With reference to FIG. 2, block 202 illustrates that the method includes detecting a first visual component including a first presentation space for presenting first data by an operating first application. Accordingly, a system for binding attributes between visual components includes means for detecting a first visual component including a first presentation space for presenting first data by an operating first application. For example, as illustrated in FIG. 3, user interface monitor component 302 is configured for detecting a first visual component including a first presentation space for presenting first data by an operating first application. FIGS. 4*a-d* illustrate user interface monitor components 402 as adaptations and/or analogs of user interface monitor component 302 in FIG. 3. One or more user interface monitor components 402 operate in an execution environment 401.

In FIG. 4*a*, user interface (UI) monitor component 402*a* is illustrated as a component of application 403*a*. In FIG. 4*b*, user interface monitor component 402*b* is illustrated as component of browser 403*b*. In FIG. 4*c*, user interface monitor component 402*c* is illustrated operating external to one or more applications 403*c*. Execution environment 401*c* includes user interface monitor component 402*c* in GUI subsystem 437*c*. In FIG. 4*d*, user interface monitor component 402*d* is illustrated operating in network application 403*d* remote from a display device for presenting and/or updating a visual component. For example, user interface monitor component 402*d* may operate in application provider node 506 while a visual component is presented via a display device of user node 502 based on presentation information sent via network 504 from application provider node 506.

A visual component may be detected, for example, by receiving a request to present the visual component, receiving a request for a resource for presenting the visual component, detecting a change in at least a portion of a presentation space, intercepting a communication identifying the visual component, receiving an input corresponding to the visual component, receiving a notification identifying the visual component, and sending presentation information to present at least a portion of the visual component.

In FIG. 4*a*, user interface (UI) monitor component 402*a* may receive a request to present a visual component, such as one or more app visual components 604 illustrated in FIGS. 6*a-b*. UI monitor component 402*a* may be configured to intercept and/or otherwise mediate access to one or more UI element handler components 433*a* for presenting an app visual component 604 and/or other visual components of application 403*a*. UI monitor component 402*a* may send presentation information and/or information for generating presentation information to a UI element handler component 433*a* for presenting some or all of a visual component via a display device.

In FIG. 4*b*, UI monitor component 402*b* may receive, intercept, and/or otherwise mediate processing of a request for a resource for presenting a visual component such as a browser tab, a browser window of browser 403*b*, and/or content received from network application 403*d* in FIG. 4*d* operating in application provider node 506. Content from network application 403*d* may include network application agent 405*b* and/or content retrieved by network application agent 405*b*. UI monitor component 402*b* may be a component of browser 403*b*. Alternatively or additionally, a UI monitor component 402 may operate as a component of network application agent 405*b* and/or a component of network application 403*d* as illustrated by UI monitor component 402*d*.

UI monitor component 402*c* in FIG. 4*c* may detect a visual component based on operations performed by GUI subsystem 437*c* for the visual component. A visual component may be detected by detecting a change in a presentation space. Detecting a change to a presentation space may include detecting a visual component presented via the presentation space, detecting a visual component based on an update of the visual component in the presentation space, and/or detecting a visual component based on removing the visual component from the presentation space.

A visual component may be detected in response to a user input. UI monitor component 402*c* may receive and/or otherwise monitor user input received for a visual component. Alternatively or additionally, UI monitor component 402*c* may detect a visual component by accessing a log for recording operations associated with the visual component maintained by GUI subsystem 437*c* and/or graphics subsystem 439*c*. The log may be accessed via receiving notifications of log entries.

As described above, a visual component may be detected by an application presenting some or all of the visual component, by a remote node, and/or by a component operating external to an application presenting some or all of the visual component.

FIGS. 6*a-b* illustrate various display presentation spaces 602 and application presentation spaces 608 as exemplary presentations spaces. Applications 403 in FIGS. 4*a-c* may present data respectively processed by applications 403 in presentation spaces 608 provided for the respective applications 403.

Returning to FIG. 2, block 204 illustrates that the method further includes identifying binding information, for the first application, that specifies a mapping between a first visual attribute of the first visual component and a second visual attribute of a second visual component including a second presentation space for presenting second data by a second application. Accordingly, a system for binding attributes between visual components includes means for identifying binding information, for the first application, that specifies a mapping between a first visual attribute of the first visual component and a second visual attribute of a second visual component including a second presentation space for presenting second data by a second application. For example, as illustrated in FIG. 3, binding director component 304 is configured for identifying binding information, for the first application, that specifies a mapping between a first visual attribute of the first visual component and a second visual attribute of a second visual component including a second presentation space for presenting second data by a second application. FIGS. 4a-d illustrate binding director components 404 as adaptations and/or analogs of binding director component 304 in FIG. 3. One or more binding director components 404 operate in an execution environment 401.

The first data and the second data may have a same or different source, may have a same or different data type, and/or may represent a same entity or different entities. The data presented by one of the applications may be a representation of the other application or may not be a representation of the other application. One or more of the first application and the second application may or may not present a desktop component such as an application bar, task, bar, start menu, and the like.

Figure 7:
FIG. 7 is an illustration of binding information according to another aspect of the subject matter described herein.

FIG. 7 illustrates exemplary binding information represented in extensible markup language (XML) according to a schema specifying at least one of a format and a vocabulary for defining valid binding information. Binding information may be represented in any suitable representation including declaratory representations, source code representations, binary representations, and script representations, to name a few examples. In FIG. 7 a <visual-binding> element 702 may be defined to specify binding information for a first application identified by a first <application> tag 704-1 and a second application identified by a second <application> tag 704-2. The applications are identified by file path identifiers in FIG. 7 respectively specified by a first path attribute 706-1 and a second path attribute 706-2 included in first <application> tag 704-1 and second <application> tag 704-2. An application may be identified in other aspects by and/or otherwise based on, for example, a process identifier, a uniform resource identifier (URI), a user ID, a matching criterion based on an attribute of an application, a time, and/or a task.

FIG. 7 illustrates first id attribute 708-1 in first <application> tag 704-1. An id attribute in an <application> tag may be defined to identify and/or assign an alias for an application identified by the <application> tag. First id attribute 708-1 identifies "editor" as an alias for an HTML editor application identified by first path attribute 706-1. The "editor" alias may be recognizable by the first application and/or by an external component included in presenting a visual component of the application, such as a GUI subsystem 437 in FIGS. 4a-c. Analogously, FIG. 7 also illustrates a second id attribute 708-2 in second <application> tag 704-2. Second id attribute 708-2 identifies "navigator" as an alias for a file search application identified by second path attribute 706-2.

Id attributes 708 may be defined for specifying a matching criterion based on one or more attributes of an application and/or any other information detectable within an execution environment of an application. For example, a matching criterion for identifying an application may include and/or otherwise may be based on a user ID, a content type of data processed by the application, a time of operation, a detected change in the application, a type of visual component presented by the application, an attribute of a visual component of the application, a storage location, and/or a task.

FIG. 7 illustrates several <attribute-binding> tags 710. An <attribute-binding> tag 710 may be defined for specifying a mapping between a first visual attribute of a first visual component of a first application and a second visual attribute of a second visual component of a second application. FIG. 7 also illustrates that an id attribute 712 in an <attribute-binding> tag 710 may be assigned a value that identifies a visual attribute in a visual component. In FIG. 7, first id attribute 712-1 is assigned a value "editor.main.state". According to a schema for the illustrated binding information specified by <visual-binding> tag 702, the "editor" portion may identify the editor application based on a match with id attribute 708-1. The "main" portion, in the middle, may be an alias and/or other identifier identifying a visual component in the identified application. Id attribute 712-1 specifies a visual component assigned "main" as an alias and may identify the main window for the first application. A last portion of id attribute 712-1 may be defined to identify an attribute of the identified visual component. Id attribute 712-1 specifies "state" identifying a state attribute identifying a visual state of the visual component.

FIG. 7 illustrates several op-id attributes 714 that correspond to respective id attributes 712 included in an <attribute-binding> tag 710 with an op-id attribute 714. Op-id attribute 714-1 identifies a value for the state attribute identified in id attribute 712-1. An op-id attribute may be defined to identify a change in an attribute to be detected by an adaptation and/or analog of UI monitor component 302 in FIG. 3 such as UI monitor components 402 illustrated in FIGS. 4a-d. An "init" value may indicate a change in a visual component from uninitialized and not visible to initialized and visible. Thus, the change identified in the main visual component in the editor application is a first presentation of the main visual component.

Id attributes 712 may be defined for specifying a matching criterion based on one or more attributes, visual and/or not, of a visual component and/or any other information detectable within an execution environment for presenting the visual component application. For example, a matching criterion for identifying a visual component may include and/or otherwise may be based on type of visual component and/or other visual component attribute. A visual component may be identified based on a user ID, a content type of data presented in the visual component, a time of presentation and/or update respective to another visual component, a storage location, and/or a task, to name some examples. Analogously, a visual attribute of a visual component may be identified based on a specified matching criterion.

FIG. 7 also illustrates several <bind> tags 718 respectively in the <attribute-binding> tags 710. A <bind> tag 718 may be defined for specify a mapping between a visual component identified in an including <attribute-binding> tag 710 by an id attribute 712 and a second visual attribute of a second visual component of a second application, such as the file search application identified by second <application> tag 704-2. In an aspect, an <attribute-binding> tag 710 may include more than one <bind> tag 718 for specifying more than one mapping. In FIG. 7, first <bind> tag 718-1 includes id attribute 720-1. In an aspect, an id attribute 720 in a <bind> tag 718 may be defined for specifying a visual attribute of a visual component in the same and/or analogous manner that an id attribute 712 in an <attribute-binding> tag 710 is defined. Id attribute 720-1 may be defined to identify a "main" visual component in the navigator application identified by second <application> tag 704-2. Id attribute 720-1 in FIG. 7 may identify a "state" attribute of the main visual component in the navigator application.

An op-id attribute 722 in a <bind> tag 718 may be defined to identify a change to be made to a visual attribute identified in an id attribute 720 in the tag. Op-id attribute 722-1 in FIG. 7 may indicate that when the main window in the editor application changes to an init state and becomes visible, the main window in the navigator application should change state to be presented and be visible as well. This may require starting the navigator application if it is not already operating. Param attribute 724-1 in FIG. 7 illustrates an attribute that may be defined for specifying one or more parameters for providing and/or otherwise identifying in change information for changing a visual attribute of a visual component.

In FIG. 4a, binding director component 404a may include and/or otherwise include a reference to binding information. Binding information may be included in an installation of an application as metadata in a folder of the application stored in a persistent data store such as a file system on a hard drive. Binding director component 404a may include and/or otherwise access code for searching and/or otherwise retrieving binding information from a database, a registry, and/or other searchable data store.

In FIG. 4b, binding director component 404b may access binding information included in network application agent 405b. Alternatively or additionally, binding director component 404b may receive binding information included in and/or otherwise accessible to browser 403b. In another aspect, binding director 404b may access binding information for an application from a remote node. In a further aspect, binding director component 404b operating in user node 502 may interoperate with binding director component 404d in network application 403d operating in application provider node 506 to receive and/or otherwise identify binding information via network 504.

In FIG. 4d, binding director component 404d may identify binding information received from a client such as browser 403b in FIG. 4b. The binding information may be received from a user of browser 403b, included in browser 403b, and/or otherwise accessed by browser 403b and/or network application agent 405b. Alternatively or additionally, binding director component 404d may retrieve binding information from a data store, such as model database 421d, based on a matching criterion as described above and illustrated in FIG. 7.

In FIG. 4c, binding director component 404c may access binding information, such as illustrated in FIG. 7, from an attribute binding data store (not shown). With respect to the binding information illustrated in FIG. 7, binding director component 404c may receive a path of an executable file for first application 403-1c when first application 403-1c is initiated in execution environment 401c. Alternatively or additionally, binding director component 404c may receive a path of an executable file for first application 403-1c when first application 403-1c accesses GUI subsystem 437c to access a service and/or other resource type. Binding director component 404c may perform and/or request a lookup of binding information based on, for example, a file path of a file included in an application.

In another aspect, a binding director component 404, such as binding director component 404c, may receive an input indicating a first visual component. Binding director component 404c may present a user interface element identifying one or more attributes of the indicated visual component for selecting by a user. A user input selecting and/or otherwise identifying a visual attribute may be received by binding director component 404c. Binding director component 404c may receive additional information identifying a visual attribute of another visual component along with user input specifying a type of binding for mapping the first visual attribute to the second visual attribute in response to a change in the first visual attribute. Types of bindings are described above and illustrated in FIG. 7 identified by op-id attributes 714 in respective <attribute-binding> tags 710 and in op-id attributes 722 in respective <bind> tags 718. Thus, an arrangement of components illustrated in FIG. 3 may be adapted to receive binding information from a user based on an operating application identified in the generated binding information.

Returning to FIG. 2, block 206 illustrates that the method yet further includes detecting a first change to the first visual attribute. Accordingly, a system for binding attributes between visual components includes means for detecting a first change to the first visual attribute. For example, as illustrated in FIG. 3, binding monitor component 306 is configured for detecting a first change to the first visual attribute. FIGS. 4a-d illustrate binding monitor components 406 as adaptations and/or analogs of binding monitor component 306 in FIG. 3. One or more binding monitor components 406 operate in an execution environment 401.

A change, in a visual attribute of a visual component, may be detected by receiving a request to change the visual component including the attribute, receiving a request for a resource for changing the visual attribute, detecting a change in at least a portion of a presentation space including the visual component including the attribute, intercepting a communication identifying a change to the attribute, receiving an input corresponding to the visual component for changing the attribute, receiving a notification identifying the attribute of the visual component, and sending presentation information to present at least a portion of the visual component. Changing a visual attribute may include modifying an existing attribute, creating and/or adding the visual attribute, and/or removing the attribute from a visual component.

In FIG. 4a, binding monitor component 406a may receive a request to change a visual attribute of a visual component, such as a size, a color, a font, a width, a height, a background, an indicator of an input focus state, a transparency level, a Z-value, and/or a location of one or more app visual components 604 and/or visual components included in one or more app visual components 604 illustrated in FIGS. 6a-b. Binding monitor component 406a may be configured to intercept and/or otherwise mediate access to one or more UI element handler components 433a for changing a visual attribute of an app visual component 604 and/or other visual components of one or more applications 403a. Binding monitor component 406a may send presentation information and/or information for generating presentation information to a UI element handler component 433a for changing a visual attribute via a display device.

In FIG. 4b, binding monitor component 406b may receive, intercept, and/or otherwise mediate processing of a request for a resource for changing a visual attribute of a visual component such as a background of a browser tab of browser 403*b*, and/or a location of a visual component presented via browser 403*b* by network application agent 405*b* received from network application 403*d* in FIG. 4*d* operating in application provider node 506. Binding monitor component 406*b* may be a component of browser 403*b*. Alternatively or additionally, a binding monitor component 406 may operate as a component of network application agent 405*b* and/or a component of network application 403*d* as illustrated by binding monitor component 406*d*.

Binding monitor component 406*c* in FIG. 4*c* may detect a change in a visual attribute of a visual component based on one or more operations performed by GUI subsystem 437*c* for and/or otherwise associated with the visual component. A change in a visual attribute may be detected by detecting changes in a presentation space such as a display presentation space 602 illustrated in FIGS. 6*a-b*. A change to a presentation space may include detecting a change to a visual attribute of a visual component presented via the presentation space, detecting a change based on an update of the visual component in the presentation space, and/or detecting a change based on removing the visual attribute from the visual component in the presentation space. A change to a visual attribute may be in response to and detected in response to a user input.

Binding monitor component 406*c* may receive and/or otherwise monitor user input received for a visual component. Alternatively or additionally, binding monitor component 406*c* may receive change information by accessing a log maintained by GUI subsystem 437*c* and/or graphics subsystem 439*c*. The log may be accessed via receiving notifications of log entries.

As described above, a change in a visual attribute of a visual component may be detected by an application presenting some or all of the visual component, by a remote node, and/or by a component operating external to an application presenting some or all of the visual component.

FIG. 7 illustrates that exemplary visual attributes include a visual state of a visual component, an input focus state which is visually detectable, a size, a transparency level, and a location. FIG. 7 further illustrates that binding information may identify a visual attribute of a visual component for which a change is to be detected. A binding monitor component 406 may access and process binding information illustrated in FIG. 7 to identify visual components and visual attributes to monitor.

Returning to FIG. 2, block 208 illustrates that the method yet further includes, in response to detecting the first change, automatically sending change information to change the second visual attribute according to the mapping. Accordingly, a system for binding attributes between visual components includes means for, in response to detecting the first change, automatically sending change information to change the second visual attribute according to the mapping. For example, as illustrated in FIG. 3, change director component 308 is configured for, in response to detecting the first change, automatically sending change information to change the second visual attribute according to the mapping. FIGS. 4*a-d* illustrate change director components 408 as adaptations and/or analogs of change director component 308 in FIG. 3. One or more change director components 408 operate in an execution environment 401.

Change information for changing a visual attribute of a visual component may be sent via any suitable mechanism including an invocation mechanism, such as a function and/or method call utilizing a stack frame; an interprocess communication mechanism, such as a pipe, a semaphore, a shared data area, and/or a message queue; a register of a hardware component, such as an IPU register; and/or a network communication, such as an HTTP request and/or an asynchronous message.

In FIG. 4*a*, change director component 408*a* may include a UI element handler component 433*a* for presenting and/or otherwise sending change information for changing a second visual attribute of a second visual component, in response to detecting a change in a first visual attribute of a first visual component. A UI element handler component 433*a* in change director component 408*a* may send presentation information for changing a visual attribute by invoking GUI subsystem 437*a* to present the visual component with the changed visual attribute. Alternatively or additionally, change director component 408*a* may interoperate with a user interface handler component 433*a* for changing the visual attribute in a presentation of a visual component. For example, change director component 408*a* may send color information to change a color of a title bar of a visual component in response to a detecting a change in a Z-value of another visual component. The color may indicate a state of one or more resources represented in the visual component with respect to a change in an operating state of the application where the operating state change is indicated by the change in Z-value.

Presentation information representing a new, updated, and/or removed attribute may include information for changing a border thickness in a border included in a visual component. The border thickness may mirror the thickness or width of a border in another visual component. The presentation information may be sent, for example by GUI subsystem 437*a* in FIG. 4*a*, to present the change in the visual attribute based on the mapping specified in the binding information. The change information is sent in response to a detected change in a visual attribute identified by the binding information.

As described above and illustrated in <attribute-binding> tag 710-1 in FIG. 7, a change in an operating state that is visually detectable by a user may be detected and mapped to a change in a visually detectable attribute including an operating state of another application. FIG. 7 illustrates other exemplary mappings between visual attributes of visual components presented by respective applications. In <attribute-binding> tag 710-2, a size attribute of the main window of the editor application is identified by id attribute 712-2. Op-id attribute 714-2 specifies "max", which may be defined to indicate a change of the size of the main window to a maximum size in a presentation space in which the main window visual component is presented. A size attribute of the main visual component of the navigator application is identified in id attribute 720-2 in <bind> tag 718-2 defining a mapping between a change in size in the main visual component in the editor application to a change in size in the main visual component in the navigator application. Op-id attribute 722-2 specified as "min" may be defined to indicate that the main window of the navigator application is to be minimized in response to detecting that the main window of the editor application has changed to a maximum size.

In an aspect, binding information may include information specifying whether a mapping is unidirectional or bidirectional. A symmetric attribute 716-2 is illustrated in <attribute-binding> tag 710-2. The symmetric attribute 716-2 illustrates an exemplary attribute which may be defined to indicate that the mapping specified in <attribute-binding> tag 710-2 is symmetric, indicating that changes in the second visual component are to be detected and the first visual component is to be changed according to the specified mapping. In FIG. 7, mappings may be non-symmetric or unidirectional by default.

In <attribute-binding> tag 710-3, FIG. 7 illustrates that the size attribute of the main window of the editor application is specified by id attribute 712-3. Op-id attribute 714-3 specifies "change" which may be defined to indicate that any and/or every change in the size of the main window is to be detected. The size attribute of the main visual component of the navigator application is identified in id attribute 720-3 in <bind> tag 718-3 defining another mapping between a change in size in the main visual component in the editor application to a change in size in the main visual component in the navigator application. Op-id attribute 722-3 specified as "opposite" may be defined to indicate that the main window of the navigator application is to be changed in size in an opposite manner to a detected change in size of the first visual component identified in <attribute-binding> tag 710-3. Thus when the first visual component increases in size, the second visual component is to be decreased in size and vice versa. Symmetric attribute 716-3 may be specified as illustrated to indicate that the mapping is bidirectional.

In <attribute-binding> tag 710-4, FIG. 7 illustrates that the size attribute of the main window of the editor application is again specified by id attribute 712-4. Op-id attribute 714-4 specifies the value "resize", which may be defined to be an equivalent of the "change" value described above. The size attribute of the main visual component of the navigator application is identified in id attribute 720-4 in <bind> tag 718-4 defining a mapping between a change in size in the main visual component in the editor application to a change in size and/or location in the main visual component in the navigator application. Op-id attribute 722-4 specified as "empty-space" may be defined to indicate that the main window of the navigator application is to be changed to fill the largest space external to the first visual component identified in <attribute-binding> tag 710-4 in a presentation space including both visual components. Symmetric attribute 716-4 may be specified as illustrated to indicate that the mapping is not bi-directional.

In <attribute-binding> tag 710-5, FIG. 7 illustrates a location attribute of the main window of the editor application specified by id attribute 712-5. Op-id attribute 714-5 specifies the value "change", which may be defined to be any and/or every change that is to be detected in the location of the identified visual component. The location attribute of the main visual component of the navigator application is identified in id attribute 720-5 in <bind> tag 718-5 defining a mapping between a change in a location in the main visual component in the editor application to a change in size and/or location in the main visual component in the navigator application. Op-id attribute 722-5 specified as "empty-space" may be defined to indicate that the main window of the navigator application is to be changed to fill the largest space external to the first visual component identified in <attribute-binding> tag 710-5 in a presentation space including both visual components. Symmetric attribute 716-5 may be specified as illustrated to indicate that the mapping is bi-directional.

In <attribute-binding> tag 710-6, FIG. 7 illustrates a state attribute of the main window of the editor application specified by id attribute 712-6. Op-id attribute 714-6 specifies the value "on-focus", which may be defined to identify a change including an assignment of input focus for an input device for the visual component. A change in input focus state is visually detectable by a user via one or more attributes of the visual component. The location attribute of the main visual component of the navigator application is identified in id attribute 720-6 in <bind> tag 718-6 defining a mapping between a change in a focus attribute included in the state of the main visual component in the editor application to a change in size and/or location in the main visual component in the navigator application. Op-id attribute 722-6 specified as "empty-space" may be defined to indicate that the main window of the navigator application is to be changed, if needed, to fill the largest space external to the first visual component identified in <attribute-binding> tag 710-6 in a presentation space including both visual components when the main window in the editor program is assigned input focus. Symmetric attribute 716-6 may be specified as illustrated to indicate that the mapping is bi-directional.

In <attribute-binding> tag 710-7, FIG. 7 illustrates a transparency attribute of the main window of the editor application specified by id attribute 712-7. Op-id attribute 714-7 specifies the value "change", which may be defined to identify a change in a transparency level of the visual component. The transparency attribute of the main visual component of the navigator application is identified in id attribute 720-7 in <bind> tag 718-7 defining a mapping between a change in a transparency attribute of the main visual component in the editor application to a change in transparency in the main visual component in the navigator application. Op-id attribute 722-7 specified as "match" may be defined to indicate that the transparency of the main window of the navigator application is to be changed, to match the transparency of the first visual component identified in <attribute-binding> tag 710-7 in a presentation space including both visual components when the main window in the editor program is assigned input focus. Symmetric attribute 716-7 may be specified as illustrated to indicate that the mapping is bi-directional.

FIGS. 6a-b illustrate other exemplary mappings that may be supported by various adaptations of the arrangement of components in FIG. 3 in various aspects. In FIG. 6a, a top border of first app visual component 604-1a may be mapped to a bottom border of second app visual component 604-2a as specified by binding information received by a binding director component, such as binding director component 404b in FIG. 4. First app visual component 604-1a may be presented by browser 403b. In another aspect, a first visual component may be presented in presentation space 608-1a by network application agent 405b. A second app visual component may be presented by another application (not shown) operating in execution environment 401b. Second app visual component 604-2a may present user interface elements 614 representing resources that may be processed by browser 403b and/or network application agent 405b. For example, network application agent 405b may include data for uploading one or more media files, such as a video, to a video service site provided by network application 403d provided by a service provider including application provider node 506. Selecting a resource user interface element, illustrated by resource user interface element 6142b, may automatically add the resource represented by the user interface element to an upload list. Alternatively or additionally, the position of second app visual component 604-2a with respect to first app visual component 604-1b allows a user to easily drag and drop a resource user interface element 614 onto presentation space 608-1a for processing a resource represented by the user interface element. The resource may be processed by browser 403b, by network application agent 405b, and/or by network application 403d operating in a remote node, such as application provider node 506 in FIG. 5.

The two applications may interoperate based on binding information included in and/or otherwise identified by one or both applications. In an aspect, binding information may specify that changes to a location and/or size of the top border of first app visual component 604-1a are to be mirrored or matched by changes in the bottom border of second app visual component 604-2a. This may be specified by mapping the two borders and/or may be specified indirectly by mapping size and location attributes between the two visual components. Note that as the top border of first app visual component 604-1a changes size and/or location, the size and/or location of other visual components included in one or both of first app visual component 604-1a and second app visual component 604-2a may change. For example, when a change in location of the top border of first app visual component 604-1a is detected and it is determined that the top border has moved toward the top of desktop presentation space 602a, the size and shape of second app visual component 604-2a may change. For example, the side borders may be made shorter. Binding information may be specified in terms of these other changes in addition to or instead of binding information that identifies the top border of first app visual component 604-1a and the bottom border of second app visual component 604-2a.

In FIG. 6b, first app visual component 604-1b, second app visual component 604-2b, and third app visual component 604-3b may have respective visual attributes that are mapped by one or more binding information specifications. For example, size and location attributes of each of the visual components may be bound. When first app visual component 604-1b changes from minimized to a restored or maximized size and location, change information may be sent to respective applications by a change director component 408 to change one or both of second app visual component 604-2b and third app visual component 604-3b to a minimized state presented in specified respective locations in display presentation space 602b. First binding information may be specified for mapping first app visual component 604-1b and second app visual component 604-2b. Second binding information may be specified for mapping first app visual component 604-1b and third app visual component 604-3b. Third binding information may be specified for mapping second app visual component 604-2b and third app visual component 604-3b. In an aspect, a single instance of binding information may include all the mapping information for all mappings among the visual attributes of the three visual components.

The method illustrated in FIG. 2 may include additional aspects supported by various adaptations and/or analogs of the arrangement of components in FIG. 3. In various aspects, detecting a visual component may include receiving an indication to present the visual component, detecting an access to a resource for presenting the visual component, intercepting a communication for presenting the visual component, and/or receiving a message via a network identifying the visual component. Detecting an access to a resource for presenting a visual component may include detecting an access to an output device to present the visual component.

A resource accessed for presenting a visual component may include a semaphore, a lock, a presentation space, a component of a graphical user interface subsystem, a component of a graphics subsystem, a display adapter, a display device, an access control component, a serialization component, a synchronization component; and/or a network component. For example, access to a buffer in a display adapter may be serialized via a semaphore or lock. The buffer may provide storage for a presentation space. In FIG. 4c, UI monitor 402c may include instructions implementing the semaphore. Presenting a visual component, in an aspect, may require requesting the semaphore. UI monitor component 402c may receive the request for the semaphore and identify and/or otherwise detect a visual component in response to providing the semaphore, which may allow access to the presentation space via one or more service functions provided by GUI subsystem 437c.

Detecting a visual component may include receiving a user input corresponding to the visual component and/or another visual component. As described above, a GUI subsystem 437 in any and/or all of FIGS. 4a-d may receive an input from an input device via an input driver 441. The input may be associated with a location in a presentation space of a display, such as location of a visual pointer icon and/or a location of a user interface element having input focus for the input device. GUI subsystem 437 may identify an application having a visual component presented in the location and provide input information to the application for the corresponding visual component. The input information provided by GUI subsystem 437 may identify the visual component to a respective UI monitor component 402 in a respective execution environment 401 in some or all of FIGS. 4a-d.

A visual component may be included in and/or may include a window, a textbox, a user interface input control, a button control, a check box, a radio button, a slider, a progress bar, a list box, a drop-down list, a spinner, a menu, a menu item, a menu bar, a tool button, a toolbar, a ribbon, a combo box, a tree view, a grid view, a tab, a scrollbar, a label, a tooltip, text, a balloon, and/or a dialog box.

Detecting a first visual component may include detecting a second visual component. Binding information may be identified based the second visual component. The first visual component may be identified based on a mapping identified in the binding information. FIG. 7 illustrates that given a path identifier of either of the applications identified in the <application> 704 tags, the other application may be identified.

Detecting a visual component may include receiving binding information. The binding information may identify the visual component and/or the visual component may otherwise be identified based on the binding information. In an aspect, binding information may include and/or otherwise identify a matching criterion that matches an application and/or a visual component of an application. For example, a binding director component 404 in any or all of FIGS. 4a-d may retrieve and/or otherwise receive binding information. The binding information may identify one or more visual components of one or more applications. The binding director component 404 may provide information identifying the one or more visual components to a respective UI monitor component 402 to identify visual components and corresponding visual attributes to monitor for changes. In FIG. 7, <attribute-binding> tags 710 identify visual components of applications identified in <application> tags 704.

Binding information may be based on one or more of an attribute of a type of data processed by one or more applications, a program link between a first application and a second application, an operation that includes processing by a first application and processing by a second application, a data entity accessible to a first application and a second application, and an output of an application that is processed as an input by another application. For example, a binding director component 404 in any of FIGS. 4a-d may generate and/or otherwise identify binding information for a visual component based on determining that a first visual component presents data having a content type that matches an input data type of a second application. The binding director 404 may generate binding information automatically and/or may provide information for a user to specify some of the binding information.

Binding information may be received from and/or otherwise be configurable by a user of one more or applications associated with the binding information. Binding information may be located and/or otherwise identified for a visual component based on a matching criterion based on one or more of an attribute of the visual component, an application presenting the visual component, a user of the application, a device hosting the application, and a task, as well as other information described above and/or illustrated in FIG. 7. Binding information may include an application identifier of an application, a visual component identifier of a visual component, and/or an attribute identifier of a visual attribute of a visual component.

Exemplary visual attributes of a visual component that may be included in a mapping specified in binding information include one or more of a font, a color, a location in a presentation space, a size, a visibility attribute, a shape, a measure of time, a Z-value, a transparency attribute, a shading attribute, a visible pattern, a line thickness, and an attribute of a background. A visual attribute of a visual component may include a visual attribute of a visual subcomponent of the visual component.

Binding information may be identified via a message received via a network, an interprocess communication mechanism, a shared region of a data storage medium, and/or a user input. Binding information may be included in an application. Binding information may be identified based on a user of a visual component, an administrator of an application, a developer of at least a portion of an application, and/or a distributor of an application. Identifying binding information may include receiving the binding information from a first application, locating the binding information based on an attribute of the first application, and/or receiving a user input identifying the binding information.

Detecting a change to a visual attribute of a visual component may include receiving attribute information, for changing the visual attribute, in response to a user input corresponding to a first visual component. The change may be detected based on the attribute information. Detecting a change may include receiving a change indication identifying the change. Detecting a change may include receiving change information via a message received via a network, an interprocess communication mechanism, a shared region of a data storage medium, and/or a user input. Detecting a change may include receiving an indication to change a visual attribute, detecting an access to a resource for changing a visual attribute, intercepting a communication for changing a visual attribute, and receiving a message via a network identifying a visual attribute.

Detecting an access to a resource for changing a visual attribute may include detecting an access to an output device to change the visual attribute. The resource may include one or more of a semaphore, a lock, a presentation space, a component of a graphical user interface subsystem, a component of a graphics subsystem, a display adapter, a display device, an access control component, a serialization component, a synchronization component, and a network component.

Detecting a change to a visual attribute of a visual component may include receiving a user input corresponding to the visual component. For example, a location of a visual component may be changed in response to a dragging and dropping operation detected by a pointing and/or touch input device. A binding monitor 406 in FIGS. 4a-4d may detect a dragging and dropping operation.

Sending change information may include determining a visual attribute to change based on a mapping specified in binding information. The change information may be sent to an application presenting a visual component including the visual attribute and/or may be sent for updating a portion of a presentation space of a display via a component external to the application. A binding director component 404 in any of FIGS. 4a-d may determine change information based on <attribute-binding> tags 710 in FIG. 7. The change information is included in and/or identified by information included in corresponding <bind> tags 718 as described above.

In various aspects, change information may be sent via a stack frame, a register of a processor, an interprocess communication (IPC) mechanism, a shared location in a data storage medium, a semaphore, a lock, and/or a message transmitted via a network. Exemplary IPC mechanisms include a hardware interrupt, a software interrupt, a message queue, a pipe, and/or an internal socket.

To the accomplishment of the foregoing and related ends, the descriptions herein and the referenced figures set forth certain illustrative aspects and/or implementations of the subject matter described. These are indicative of but a few of the various ways the subject matter may be employed. The other aspects, advantages, and novel features of the subject matter will become apparent from the detailed description included herein when considered in conjunction with the referenced figures.

It should be understood that the various components illustrated in the various block diagrams represent logical components that are configured to perform the functionality described herein and may be implemented in software, hardware, or a combination of the two. Moreover, some or all of these logical components may be combined, some may be omitted altogether, and additional components may be added while still achieving the functionality described herein. Thus, the subject matter described herein may be embodied in many different variations, and all such variations are contemplated to be within the scope of what is claimed.

To facilitate an understanding of the subject matter described above, many aspects are described in terms of sequences of actions that may be performed by elements of a computer system. For example, it will be recognized that the various actions may be performed by specialized circuits or circuitry (e.g., discrete logic gates interconnected to perform a specialized function), by program instructions being executed by one or more instruction-processing units, or by a combination of both. The description herein of any sequence of actions is not intended to imply that the specific order described for performing that sequence must be followed.

Moreover, the methods described herein may be embodied in executable instructions stored in a computer-readable medium for use by or in connection with an instruction-execution machine, system, apparatus, or device, such as a computer-based or processor-containing machine, system, apparatus, or device. As used herein, a "computer-readable medium" may include one or more of any suitable media for storing the executable instructions of a computer program in one or more of an electronic, magnetic, optical, electromagnetic, and infrared form, such that the instruction execution machine, system, apparatus, or device may read (or fetch) the instructions from the computer-readable medium and execute the instructions for carrying out the described methods. A non-exhaustive list of conventional exemplary computer-readable media includes a portable computer diskette; a random access memory (RAM); a read only memory (ROM); an erasable programmable read only memory (EPROM or Flash memory); optical storage devices, including a portable compact disc (CD), a portable digital video disc (DVD), a high definition DVD (HD-DVD™), and a Blu-Ray™ disc; and the like.

Thus, the subject matter described herein may be embodied in many different forms, and all such forms are contemplated to be within the scope of what is claimed. It will be understood that various details may be changed without departing from the scope of the claimed subject matter. Furthermore, the foregoing description is for the purpose of illustration only, and not for the purpose of limitation, as the scope of protection sought is defined by the claims as set forth hereinafter together with any equivalents.

All methods described herein may be performed in any order unless otherwise indicated herein explicitly or by context. The use of the terms "a" and "an" and "the" and similar referents in the context of the foregoing description and in the context of the following claims are to be construed to include the singular and the plural, unless otherwise indicated herein explicitly or clearly contradicted by context. The foregoing description is not to be interpreted as indicating that any non-claimed element is essential to the practice of the subject matter as claimed.

I claim:

1. An apparatus, comprising:
at least one processor;
an input device operatively coupled to the at least one processor;
a screen operatively coupled to the at least one processor; and
memory operatively coupled to the at least one processor;
said memory operatively coupled to the at least one processor configured to store a first application, a second application, and a third application;
said input device operatively coupled to the at least one processor configured to detect, utilizing the at least one processor, a first user input;
said screen operatively coupled to the at least one processor configured to present, utilizing the at least one processor, an application window representation group including a plurality of application window representations including a second application window representation associated with the second application and a third application window representation associated with the third application;
said screen operatively coupled to the at least one processor configured to, in response to the first user input, present, utilizing the at least one processor, a first window for presenting first data associated with the first application;
said input device operatively coupled to the at least one processor configured to detect, utilizing the at least one processor, a second user input;
said screen operatively coupled to the at least one processor configured to, in response to the second user input, present, utilizing the at least one processor, a second window for presenting second data associated with the second application where a first size of the first window is sized to fit a second size of the second window on the screen, such that a first border of the first window corresponds to a second border of the second window;
said input device operatively coupled to the at least one processor configured to detect, utilizing the at least one processor, a third user input;
said screen operatively coupled to the at least one processor configured to, in response to the third user input, change, utilizing the at least one processor, the presentation of the first window and the second window, such that the first border of the first window remains visible in correspondence based on the second border of the second window.

2. The apparatus of claim 1, wherein the apparatus is configured such that the third user input include dragging.

3. The apparatus of claim 1, wherein the apparatus is configured such that the first application and the second application are operating during each instance of the detecting.

4. The apparatus of claim 1, wherein the apparatus is configured such that the first application and the second application are network applications that are associated with at least one web service and are capable of dynamically retrieving data from at least one database based on requests.

5. The apparatus of claim 1, wherein the apparatus is configured such that the presentation of the first window includes changing from a minimized state to a maximized state.

6. The apparatus of claim 1, wherein the apparatus is configured such that the first size of the first window and the second size of the second window are symmetric, in response to the second user input.

7. The apparatus of claim 1, wherein the apparatus is configured such that the first size of the first window and the second size of the second window are asymmetric, in response to the third user touch input.

8. The apparatus of claim 1, wherein the apparatus is configured such that the third user touch input includes dragging the first border of the first window, such that a first movement of the first border is mirrored or matched by a second movement of the second border, and the first size of the first window and the second size of the second window are non-symmetric.

9. The apparatus of claim 1, wherein the apparatus is configured such that the first window solely occupies the screen until the first user input is detected, such that a maximum amount of a presentation space of the screen is available for use for the first window until the first user touch input is detected, after which the presentation space of the screen is shared between the first window and the second window in response to the detection of the second user input.

10. The apparatus of claim 1, wherein the apparatus is configured such that the detecting the third user input is capable of including detecting a selection of the first border of the first window or the second border of the second window.

11. The apparatus of claim 1, wherein the apparatus is configured such that the detecting the third user touch input is capable of including detecting a selection of a control corresponding to the first border of the first window and the second border of the second window.

12. The apparatus of claim 1, wherein the at least one processor is operatively coupled to the screen and the memory via at least one bus.

13. The apparatus of claim 1, wherein the apparatus is configured such that the first border includes an outer part or edge of the first window, and the second border includes an outer part or edge of the second window.

14. The apparatus of claim 1, wherein the apparatus is configured such that the third user input corresponds to at least one of the first border of the first window or the second border of the second window at least substantially fills any space external to the first window.

15. The apparatus of claim 1, wherein the apparatus is configured such that the presentation of the first window and the second window is changed by changing a respective size of the first window and the second window, such that the second window fills any space external to the first window.

16. A system, comprising:
a user interface monitor component, a binding director component, a binding monitor component, and a change director component operatively coupled for operation in an execution environment in connection with a first application, a second application, and a third application;
said user interface monitor component configured to:
present an application window representation menu including a plurality of application window representations including a second application window representation associated with the second application and a third application window representation associated with the third application;
detect a first user input;
in response to the first user input, present a first window for presenting first data associated with the first application;
detect a second user input in connection with the second application window representation associated with the second application;
in response to the second user input, automatically present a second window for presenting second data associated with the second application where a first size of the first window accommodates a second size of the second window, such that a first border of the first window corresponds to a second border of the second window; and
detect a third user input causing a change to at least one of the first border of the first window or the second border of the second window;
said binding director component configured to identify binding information that specifies a mapping between the first border of the first window and the second border of the second window;
said binding monitor component configured to detect the change to the at least one of the first border of the first window or the second border of the second window;
said change director component configured to, in response to the change, automatically update the presentation of the first window and the second window based on the binding information, such that the first border of the first window is mapped to the second border of the second window.

17. An apparatus, comprising:
first means for storing a first application, a second application, and a third application;
second means for:
presenting an application window representation menu including a plurality of application window representations including a second application window representation associated with the second application and a third application window representation associated with the third application;
detecting a first user input;

in response to the first user input, presenting a first window for presenting first data associated with the first application;
detecting a second user input in connection with the second application window representation associated with the second application;
in response to the second user input, presenting a second window for presenting second data associated with the second application, where a first size of the first window accommodates a second size of the second window, such that a first border of the first window corresponds to a second border of the second window;
detecting a third user input corresponding to at least one of the first border of the first window or the second border of the second window; and
in response to the third user input, automatically causing a change in the presentation of the first window and the second window, such that the first border of the first window corresponds to the second border of the second window.

18. The apparatus of claim 1, wherein the apparatus is configured such that the application window representation group is presented before the detection of the first user input and the application window representation group includes a first application window representation associated with the first application, such that the first user input is in connection with the first application window representation associated with the first application.

19. The apparatus of claim 18, wherein the apparatus is configured such that the application window representations include thumbnails.

20. The apparatus of claim 18, wherein the apparatus is configured such that the first user input includes a dragging and dropping in connection with the first application window representation.

21. The apparatus of claim 18, wherein the apparatus is configured such that:
said first user input is detected prior to the second user input, and the second user input is detected prior to the third user input;
said first user input, the second user input, and the third user input each includes a single user input;
no other user inputs are detected between the first user input and the second user input; and
no other user inputs are detected between the second user input and the third user input.

22. The apparatus of claim 1, wherein the apparatus is configured such that said screen operatively coupled to the at least one processor is configured to, in response to a key input after the first user input which results in a change in a particular size and a particular location of the first window, present, utilizing the at least one processor, the second application window representation adjacent to the first window such that the second user input includes a selection of the second application window representation.

23. The apparatus of claim 1, wherein the apparatus is configured such that the application window representation group is presented adjacent to the first window in response to a key input after the first user input that results in a change in a particular size and a particular location of the first window in connection with the presentation thereof, and the second user input includes a selection of the second application window representation.

24. The apparatus of claim 23, wherein the apparatus is configured such that at least a location of the application window representation group is based on a dragging and dropping in connection with the first window, and the application window representations are presented in a desktop space exterior to the first window.

25. The apparatus of claim 23, wherein the apparatus is configured such that:
said first user input is detected prior to the second user input, and the second user input is detected prior to the third user input;
said first user input, the second user input, and the third user input each includes a single user input;
no other user inputs are detected between the first user input and the second user input; and
no other user inputs are detected between the second user input and the third user input.

26. The apparatus of claim 1, wherein the apparatus is configured such that the application window representation group moves in response to movement of the first window by a user.

27. The apparatus of claim 1, wherein the apparatus is configured such that a size of the application window representation group changes in response to a sizing of the first window, by a user.

28. The apparatus of claim 1, wherein the apparatus is configured such that a size of application window representations changes in response to a sizing of the first window, by a user.

29. The apparatus of claim 1, wherein the apparatus is configured such that the application window representation group is presented in a first place with respect to the first window if the first user input involves first particular input, and in a second place with respect to the first window if the first user input involves second particular input.

30. The apparatus of claim 1, wherein the apparatus is configured such that the application window representation group is displayed in available desktop space that would otherwise be used to present displayed windows and is further re-sized in response to a sizing of the first window by a user, so that the application window representations of the application window representation group are readily accessible for selection for user-configurable binding between multiple windows.

31. The apparatus of claim 1, wherein the apparatus is configured such that the application window representation group is displayed in available desktop space that would otherwise be used to present displayed windows, moves in response to movement of the first window by a user, and is re-sized in response to re-sizing of the first window by the user, so that the application window representations of the application window representation group are located and sized to facilitate a selection thereof for user-configurable simultaneous presentation of multiple windows.

32. The apparatus of claim 1, wherein the apparatus is configured such that the first window includes a user-selectable user interface element, and the second user input is in connection with the user-selectable user interface element of the first window.

33. The apparatus of claim 32, wherein the apparatus is configured such that the second user input results in initialization of the second window.

34. The apparatus of claim 33, wherein the apparatus is configured such that the initialization includes creation.

35. The apparatus of claim 32, wherein the apparatus is configured such that the second data associated with the second application is based on the user-selectable user interface element of the first window.

36. The apparatus of claim 32, wherein the apparatus is configured such that the user-selectable user interface element of the first window includes a representation of a file.

37. The apparatus of claim 32, wherein the apparatus is configured such that the user-selectable user interface element of the first window is part of a menu.

38. The apparatus of claim 32, wherein the apparatus is configured such that the second application includes a browser for loading media associated with the user-selectable user interface element.

39. The apparatus of claim 1, wherein the apparatus is configured such that the first window includes a user-selectable user interface element corresponding to a file, and the second user input is in connection with the user-selectable user interface element of the first window such that the second user input results in initial presentation of the second window in the form of a browser window where the second data includes the file.

40. The apparatus of claim 1, wherein the apparatus is configured such that the application window representation group is presented before the detection of the first user input and the application window representation group includes a first application window representation associated with the first application, such that the first user input is in connection with the first application window representation associated with the first application, wherein the apparatus is further configured such that the first window includes a user-selectable user interface element corresponding to a file, and the second user input is in connection with the user-selectable user interface element of the first window such that the second user input results in presentation of the second window in the form of a browser window where the second data is associated with the file.

41. The apparatus of claim 40, wherein the apparatus is configured such that: the first application and the second application are operating and accessible when the first user input is detected; the first size of the first window and the second size of the second window are symmetric in response to the second user input and asymmetric in response to the third user input; and the third user input includes dragging the first border such that a first movement of the first border is mirrored or matched by a second movement of the second border.

42. The apparatus of claim 1, wherein the apparatus is configured such that the first window is presented along with the application windows representation group in response to a key input after the first user input which includes a dragging and dropping in connection with the first window that results in a change in a particular size and a particular location of the first window in connection with the presentation thereof, wherein the apparatus is further configured such that the first window includes a user-selectable user interface element corresponding to a file, and the second user input is in connection with the user-selectable user interface element of the first window such that the second user input results in initial presentation of the second window in the form of a browser window where the second data is associated with the file.

43. The apparatus of claim 1, wherein the apparatus is configured such that the application window representation group is displayed prior to the detection of the first user input.

44. The apparatus of claim 1, wherein the apparatus is configured such that the first window includes a user interface element, and said input device operatively coupled to the at least one processor is further configured to detect, utilizing the at least one processor, a fourth user input including a dragging and dropping of the user interface element between the first window and the second window for processing information associated with the user interface element utilizing the second application.

45. The apparatus of claim 44, wherein the apparatus is configured such that the dragging and dropping is facilitated by the first border of the first window remaining in correspondence based on the second border of the second window.

46. The apparatus of claim 44, wherein the apparatus is configured such that the dragging and dropping is facilitated by the first window and the second window being non-overlapping and sized to split a maximum amount of a presentation space of the screen.

47. The apparatus of claim 1, wherein the apparatus is configured such that a color of a title bar of the first window is changed based on a desktop component.

48. The apparatus of claim 47, wherein the apparatus is configured such that the desktop component includes a desktop background.

49. The apparatus of claim 47, wherein the apparatus is configured such that the desktop component includes a desktop picture.

50. The apparatus of claim 47, wherein the apparatus is configured such that the color of the title bar of the first window is changed based on the desktop component, as a function of at least one user-configurable setting.

51. The apparatus of claim 1, wherein the apparatus is configured such that the first border of the first window remains in correspondence based on the second border of the second window as a result of control by a graphical user interface subsystem.

52. The apparatus of claim 1, wherein the apparatus is configured such that the first border of the first window remains in correspondence based on the second border of the second window as a result of control by an operating system.

53. The apparatus of claim 1, wherein the apparatus is configured such that information associated with the first border of the first window remaining in correspondence based on the second border of the second window, is stored at a remote node.

54. The apparatus of claim 1, wherein the apparatus is configured such that information associated with the first border of the first window remaining in correspondence based on the second border of the second window, is stored for a subsequent presentation of the first window and the second window, such that the first border of the first window remains in correspondence based on the second border of the second window.

55. The apparatus of claim 1, wherein the apparatus is configured such that the change for the presentation of the first window is opposite of the change for the second window.

56. The apparatus of claim 1, wherein the apparatus is configured such that the second application window representation includes a reduced application window representation and the third application window representation includes another reduced application window representation.

57. The apparatus of claim 1, wherein the apparatus is configured such that: the first application and the second application are operating and accessible when the first user input is detected; the first size of the first window and the second size of the second window are symmetric in response to the second user input and asymmetric in response to the third user input; and the third user input includes dragging the first border such that a first movement of the first border is mirrored or matched by a second movement of the second border.

58. The apparatus of claim 1, wherein the apparatus is configured such that the first window solely occupies a presentation space until the first user input is detected, such that a maximum amount of the presentation space of the screen is available for use for the first window until the first user input is detected, after which the presentation space of the screen is split between the first window and the second window in response to the second user input.

59. The apparatus of claim 1, wherein the apparatus is configured such that the second application window representation includes a thumbnail.

60. The apparatus of claim 1, wherein the apparatus is configured such that at least one of:
- at least one of said detecting includes receiving for detection purposes;
- at least one of said detecting is performed utilizing at least one of a graphical user interface subsystem, or a graphics subsystem user interface monitor;
- at least one of said detecting is performed utilizing the at least one processor in connection with at least one of a graphical user interface subsystem, or a graphics subsystem user interface monitor;
- at least one of said detecting includes at least one of receiving a request to change a visual component, receiving a request for a resource for changing a visual attribute, detecting a change in at least a portion of a presentation space including a visual component, intercepting a communication identifying a change to an attribute, receiving an input corresponding to a visual component for changing an attribute, receiving a notification identifying an attribute, or sending presentation information to present at least a portion of a visual component;
- at least one of said detecting includes at least one of receiving an indication to present a visual component, detecting an access to a resource for presenting a visual component, intercepting a communication for presenting a visual component, or receiving a message via a network identifying a visual component;
- said first user input is detected prior to the second user input, and the second user input is detected prior to the third user input;
- said first user input, the second user input, and the third user input each includes a single user input;
- no other user inputs are detected between the first user input and the second user input;
- no other user inputs are detected between the second user input and the third user input;
- said application window representation group takes the form of a menu;
- said application window representation group includes symmetrically-sized application window representations;
- said application window representation group includes the application window representations presented in an organized fashion;
- said application window representations include visually-perceptible representations each corresponding to an associated window;
- said application window representations include at least one of window icons or window boxes;
- said first size of the first window is sized to fit the second size of the second window by permitting the first window and the second window to be presented simultaneously;
- said first size of the first window is sized to fit the second size of the second window by providing empty space after presentation of the first window and prior to the detection of the second user input, for the second window to fill, after the detection of the second user input;

said first border of the first window corresponds to the second border of the second window, by being bound thereto;

said first border of the first window corresponds to the second border of the second window, by being presented adjacent thereto;

said first border of the first window corresponds to the second border of the second window, by the first border and the second border being presented at a same location;

said first border of the first window corresponds to the second border of the second window, by being located based thereon;

said first border of the first window corresponds to the second border of the second window, by being bound;

said presentation of the first window and the second window is changed by reducing a particular size of the first window and increasing a particular size of the second window;

said first border of the first window remains in correspondence based on the second border of the second window, by being bound;

said first border of the first window remains in correspondence based on the second border of the second window, by being at least one of bound thereto, presented adjacent thereto, or presented at a same location;

said first window is at least one of: completely presented or partially presented;

each of said operative coupling is at least one of a direct coupling or an indirect coupling;

said input device is integrated with the screen in the form of a touchscreen;

said input device is separate from the screen in the form of a keyboard or a mouse interface;

said first border includes a single side of the first window and the second border includes a single side of the second window;

said first border includes at least one of a plurality of sides of the first window and the second border includes at least one of a plurality of sides of the second window; or said first border includes a first one of at least one of a plurality of sides of the first window in response to the second user input, and includes a second one of at least one of a plurality of sides of the first window in response to the third user input.

61. The apparatus of claim 1, wherein the apparatus is configured such that:

the application window representations include application window thumbnails that are presented before the detection of the first user input and the application window representation group includes a first application window thumbnail associated with the first application, such that the first user input includes a dragging and dropping in connection with the first application window thumbnail associated with the first application that results in a change in a particular size and a particular location of the first window;

the first application and the second application are operating before the first user input, the second user input, and the third user input are detected;

the first size of the first window and the second size of the second window are symmetric in response to the second user input and asymmetric in response to the third user input; and the third user input includes dragging the first border such that a first movement of the first border is mirrored or matched by a second movement of the second border.

62. The apparatus of claim 1, wherein the apparatus is configured such that:

the application window representations include application window thumbnails that are presented in a desktop space exterior to the first window that would otherwise be used to present displayed windows, in response to the first user input which includes a dragging and dropping in connection with the first window that results in a change in a particular size and a particular location of the first window in connection with the presentation thereof;

at least a location of the application window representation group is based on the dragging and dropping in connection with the first window;

an area in which the application window thumbnails reside is re-sized in response to re-sizing of the first window by the user, so that the application window thumbnails are sized to facilitate a selection thereof for user-configurable simultaneous presentation of multiple windows;

the second user input includes a selection of the second application window representation;

the first application and the second application are operating before the first user input, the second user input, and the third user input are detected;

the first size of the first window and the second size of the second window are symmetric in response to the second user input and asymmetric in response to the third user input; and the third user input includes dragging the first border such that a first movement of the first border is mirrored or matched by a second movement of the second border.

63. The system of claim 16, wherein the system is configured such that:

the application window representations include application window thumbnails that are presented before the detection of the first user input and the application window representation menu includes a first application window thumbnail associated with the first application, such that the first user input includes a dragging and dropping in connection with the first application window thumbnail associated with the first application that results in a change in a particular size and a particular location of the first window;

the first application and the second application are operating before the first user input, the second user input, and the third user input are detected;

the first size of the first window and the second size of the second window are symmetric in response to the second user input and asymmetric in response to the third user input; and the third user input includes dragging the first border such that a first movement of the first border is mirrored or matched by a second movement of the second border.

64. The apparatus of claim 1, wherein the apparatus is configured such that:

the application window representations include application window thumbnails that are presented in a desktop space exterior to the first window that would otherwise be used to present displayed windows, in response to the first user input which includes a dragging and dropping in connection with the first window that results in a change in a particular size and a particular location of the first window;

an area in which the application window thumbnails reside is re-sized in response to re-sizing of the first window by the user, so that the application window thumbnails are sized to facilitate a selection thereof for user-configurable simultaneous presentation of multiple windows;

the second user input includes a selection of the second application window representation;

the first application and the second application are operating before the first user input, the second user input, and the third user input are detected;

the first size of the first window and the second size of the second window are symmetric in response to the second user input and asymmetric in response to the third user input; and the third user input includes dragging the first border such that a first movement of the first border is mirrored or matched by a second movement of the second border.

65. The apparatus of claim 17, wherein the apparatus is configured such that:

the application window representations include application window thumbnails that are presented in a desktop exterior to the first window in response to the first user input which includes a dragging and dropping in connection with the first window that results in a change a location of the first window in connection with the presentation thereof;

at least one aspect of the application window thumbnails is re-sized in response to re-sizing of the first window by the user, so that the application window thumbnails are sized to facilitate a selection thereof for user-configurable simultaneous presentation of multiple windows;

the second user input includes a selection of the second application window representation;

the first application and the second application are operating before the first user input, the second user input, and the third user input are detected;

the first size of the first window and the second size of the second window are symmetric in response to the second user input and asymmetric in response to the third user input; and the third user input includes dragging the first border such that a first movement of the first border is mirrored or matched by a second movement of the second border.

66. An apparatus, comprising:

at least one processor configured for coupling with a screen, an input device, and memory, and further configured for:

storage of a first application, a second application, and a third application, utilizing the memory;

presentation of, utilizing the screen, a plurality of application window representations including a second application window representation associated with the second application and a third application window representation associated with the third application;

detection of, utilizing the input device, a first user input;

in response to the first user input, presentation of, utilizing the screen, a first window for presenting first data associated with the first application;

detection of, utilizing the input device, a second user input;

in response to the second user input, presentation of, utilizing the screen, a second window for presenting second data associated with the second application, adjacent to the first window associated with the first application;

detection of, utilizing the input device, a third user input;

in response to the third user input, change of, utilizing the screen, the presentation of the first window and the second window, such that a first size of the first window and a second size of the second window are both changed.

67. The apparatus of claim 66, wherein the apparatus is configured such that:

the application window representations include application window thumbnails that are presented before the detection of the first user input and a first application window thumbnail associated with the first application is presented, such that the first user input includes a dragging and dropping in connection with the first application window thumbnail associated with the first application that results in a change in a particular size and a particular location of the first window;

the first application and the second application are operating before the first user input, the second user input, and the third user input are detected; and the first size of the first window and the second size of the second window are symmetric in response to the second user input and asymmetric in response to the third user input, such that the first window and the second window are non-overlapping and occupy a maximum amount of a presentation space of the screen.

68. The apparatus of claim 66, wherein the apparatus is configured such that:

the application window representations include application window thumbnails that are presented before the detection of the first user input and a first application window thumbnail associated with the first application is presented, such that the first user input includes a dragging and dropping in connection with the first application window thumbnail associated with the first application that results in a change in a presentation of the first window;

the first application and the second application are operating before the first user input, the second user input, and the third user input are detected; and the first size of the first window and the second size of the second window are symmetric in response to the second user input and asymmetric in response to the third user input.

69. The apparatus of claim 66, wherein the apparatus is configured such that:

the application window representations include application window thumbnails that are presented in a space exterior to the first window after the first user input which includes a dragging and dropping in connection with a first window representation that results in a presentation of the first window;

the application window thumbnails are re-sized to increase a visibility of contents of at least one thereof in response to re-sizing of the first window by the user, so that the application window thumbnails are sized to facilitate a selection thereof for user-configurable simultaneous presentation of multiple windows;

the second user input includes a selection of the second application window representation;

the first application and the second application are operating before the first user input, the second user input, and the third user input are detected; and the first size of the first window and the second size of the second window are symmetric in response to the second user input and asymmetric in response to the third user input, such that the first window and the second window are non-overlapping and occupy a maximum amount of a presentation space of the screen.

70. The apparatus of claim 66, wherein the apparatus is configured such that:

the application window representations include application window thumbnails that are presented exterior to the first window in response to the first user input which includes a dragging and dropping in connection with a first window representation that results in a presentation of the first window;

an area in which the application window thumbnails reside is re-sized in response to re-sizing of the first window by the user; and the second user input includes a selection of the second application window representation.

71. The apparatus of claim 66, wherein the apparatus is configured such that:

the second application window representation and the third application window representation are presented simultaneously with the first window and in an area exterior to the first window;

a fourth user input is detected; and in response to the fourth user input, a particular size of the first window and a third size of the area is changed such that a particular visibility of at least one of the second application window representation or the third application window representation is changed.

72. The apparatus of claim 71, wherein the apparatus is configured such that:

the second application window representation includes a first Z-value and the third application window representation includes a second Z-value so that the second application window representation overlies, at least in part, the third application window representation;

a fifth user input is detected in connection with at least one of the second application window representation or the third application window representation; and in response to the fifth user input, the presentation of the second application window representation and the third application window representation is changed such that a first visibility of the second application window representation is increased while a second visibility of the third application window representation is decreased.

73. The apparatus of claim 71, wherein the apparatus is configured such that:

the first application, the second application, and the third application are operating before the first user input, the second user input, the third user input, and the fourth user input are detected; and the first size of the first window and the second size of the second window are symmetric in response to the second user input and asymmetric in response to the third user input.

74. The apparatus of claim 71, wherein the apparatus is configured such that the fourth user input is detected in connection with a border between the area and the first window.

75. The apparatus of claim 71, wherein the apparatus is configured such that the third user input is detected in connection with a border between the first window and the second window.

76. The apparatus of claim 71, wherein the apparatus is configured such that the fourth user input includes moving a border between the area and the first window.

77. The apparatus of claim 71, wherein the apparatus is configured such that the application window representations and the first window are non-overlapping before and after the fourth user input.

78. The apparatus of claim 71, wherein the apparatus is configured such that the application window representations include thumbnails.

79. The apparatus of claim 71, wherein the apparatus is configured such that the application window representations are menu items of a menu.

80. The apparatus of claim 71, wherein the apparatus is configured such that the application window representations are components of a spinner.

81. The apparatus of claim 71, wherein the apparatus is configured such that the application window representations include a spinner.

82. The apparatus of claim 71, wherein the apparatus is configured such that the application window representations spin.

83. The apparatus of claim 71, wherein the apparatus is configured such that:

a plurality of navigation tabs of a browser application are presented including a first navigation tab and a second navigation tab, such that the first navigation tab includes a first Z-value and the second navigation tab includes a second Z-value so that the first navigation tab overlies, at least in part, the second navigation tab;

a fifth user input is detected in connection with at least one of the first navigation tab or the second navigation tab; and in response to the fifth user input, the presentation of the first navigation tab and the second navigation tab is changed such that a first visibility of the first navigation tab is decreased while a second visibility of the second navigation tab is increased.

84. The apparatus of claim 83, wherein the apparatus is configured such that the navigation tabs are menu items of a menu.

85. The apparatus of claim 83, wherein the apparatus is configured such that the navigation tabs are components of a spinner.

86. The apparatus of claim 83, wherein the apparatus is configured such that the navigation tabs include a spinner.

87. The apparatus of claim 83, wherein the apparatus is configured such that the navigation tabs spin.

88. The apparatus of claim 87, wherein the apparatus is configured such that the first application includes the browser application and each of the navigation tabs has a corresponding window capable of presenting network data.

89. The apparatus of claim 83, wherein the apparatus is configured such that the first application includes the browser application such that, in response to the fourth input, the first visibility and the second visibility are an opposite function of the particular visibility of the at least one of the second application window representation or the third application window representation.

90. The apparatus of claim 71, wherein the apparatus is configured such that: the application window representations are presented before the detection of the first user input, and a first application window representation associated with the first application is presented with the application window representations, such that the first user input includes a dragging and dropping in connection with the first application window representation associated with the first application that results in the presentation of the first window.

91. The apparatus of claim 71, wherein the apparatus is configured such that the application window representations are presented after the detection of the first user input.

92. The apparatus of claim 71, wherein the apparatus is configured such that the particular visibility is changed by increasing the particular visibility of the at least one of the second application window representation or the third application window representation, for reducing an amount of time required for managing user interfaces of at least one of the second application window representation or the third application window representation.

93. The apparatus of claim 71, wherein the apparatus is configured such that the particular visibility is changed by increasing the particular visibility of the at least one of the second application window representation or the third application window representation, for reducing an amount of time to access data of at least one of the second application window or the third application window.

94. The apparatus of claim 71, wherein the apparatus is configured such that the particular visibility is changed by increasing the particular visibility for reducing an amount of time in managing user interfaces of the first application, the second application, and the third application.

95. The apparatus of claim 71, wherein the apparatus is configured such that the particular visibility is changed by increasing the particular visibility of the at least one of the second application window representation or the third application window representation, for reducing an amount of time required for managing user interfaces of at least one of the second application window or the third application window.

96. The apparatus of claim 71, wherein the apparatus is configured such that the particular visibility is changed by increasing the particular visibility of the at least one of the second application window representation or the third application window representation, for reducing an amount of time to access data of at least one of the second application window representation or the third application window representation.

97. The apparatus of claim 71, wherein the apparatus is configured such that the application window representations are menu items of a spinner that is:
presented simultaneously with the first window in available space adjacent thereto that would otherwise be used to present at least portions of additional windows, and re-sized in response to re-sizing of the first window by the user, both so that a visibility of the menu items facilitates a selection thereof for user-configurable simultaneous presentation of multiple windows.

98. The apparatus of claim 71, wherein the apparatus is configured such that the application window representations are: presented simultaneously with the first window in available space adjacent thereto that would otherwise be used to present at least portions of additional windows, and a visibility of at least one thereof is increased in response to re-sizing of the first window by the user, so as to be located and sized to facilitate a selection thereof for user-configurable simultaneous presentation of multiple windows.

99. The apparatus of claim 71, wherein the apparatus is configured such that the application window representations are: presented simultaneously with the first window in available space adjacent thereto that would otherwise be used to present at least portions of additional windows, and re-sized in response to re-sizing of the first window by the user, so that the application window representations are sized to facilitate a selection thereof for user-configurable simultaneous presentation of multiple windows.

100. The apparatus of claim 71, wherein the apparatus is configured such that the application window representations are menu items of a spinner that is:
presented simultaneously with the first window in available space adjacent thereto that would otherwise be used to present at least portions of additional windows, and re-sized in response to re-sizing of the first window by the user, both so that the menu items are sized to facilitate a selection thereof for user-configurable simultaneous presentation of multiple windows.

101. The apparatus of claim 71, wherein the apparatus is configured such that the fourth user input occurs prior to the second user input.

102. The apparatus of claim 71, wherein the apparatus is configured such that the second application window representation and the third application window representation are at least partially presented.

103. The apparatus of claim 71, wherein the apparatus is configured such that the second application window representation and the third application window representation are completely presented.

104. The apparatus of claim 71, wherein the apparatus is configured such that the second application window representation completely overlies the third application window representation.

105. The apparatus of claim 71, wherein the apparatus is configured such that: the application window representations are presented before the detection of the first user input, and a first application window representation associated with the first application is presented with the application window representations, such that the first user input includes a dragging and dropping in connection with the first application window representation associated with the first application that results in the presentation of the first window and further the presentation of the second application window representation and the third application window representation simultaneously in an area exterior to the first window.

106. The apparatus of claim 105, wherein the apparatus is configured such that the second application window representation and the third application window representation are presented in a first location opposite of a second location that resulted from the dragging and dropping in connection with the first window; and the particular size includes the first size.

107. The apparatus of claim 105, wherein the apparatus is configured such that the second application window representation and the third application window representation are presented in different locations as a function of different user input in connection with the first window.

108. The apparatus of claim 66, wherein the apparatus is configured such that the third user input is received via a keyboard action, and the application window representations are presented in a first location that is based on a second location of the first window.

109. The apparatus of claim 66, wherein the apparatus is configured such that: the third user input is received via a keyboard action, the application window representations are presented in response to a fourth user input including another keyboard action before the second user input such that the application window representations are presented in a first location that is based on a second location of the first window, at least one of the application window representations including the third application window representation is presented in response to a fifth user input including yet another keyboard action after the third user input such that the at least one of the application window representations is presented in the first location that is based on a third location of the second window.

110. The apparatus of claim 66, wherein the apparatus is configured such that:
the application window representations further include a first application window representation associated with the first application;
the first user input includes a selection of the first application window representation and a movement of the first window to a first location; and
after the first user input, the second application window representation and the third application window representation of the application window representations are presented in a second location that is adjacent to the first location.

111. The apparatus of claim 110, wherein the apparatus is configured such that:
the second user input includes a selection of the second application window representation and a movement of the second window to a third location; and
after the second user input, the third application window representation of the application window representations is presented in the second location that is adjacent to the third location.

112. The apparatus of claim 111, wherein the apparatus is configured such that the second application window representation and the third application window representation of the application window representations are presented in the second location, in response to a keyboard input.

113. The apparatus of claim 66, wherein the apparatus is configured such that the first window and the second window are capable of being configured to be tiled in a first configuration and a second configuration where the first size and the second size are different in the first configuration as compared to the second configuration, where a first location of a menu area for presenting at least one of the application window representations is based on a second location of at least one of the first window or the second window.

114. The apparatus of claim 66, wherein the apparatus is configured such that the first window and the second window are capable of being configured to be tiled in a first configuration and a second configuration where the first size and the second size are different in the first configuration as compared to the second configuration, where a first location of a menu area for presenting at least one of the application window representations is a function of and exterior to a second location of at least one of the first window or the second window.

115. The apparatus of claim 66, wherein the apparatus is configured such that: the third user input is received via a keyboard action, the application window representations are presented in response to a fourth user input including another keyboard action before the second user input such that the application window representations are presented in a first location that is next to a second location of the first window, at least one of the application window representations including the third application window representation is presented in response to a fifth user input including yet another keyboard action after the third user input such that the at least one of the application window representations is presented in the first location that is next to a third location of the second window.

116. The apparatus of claim 66, wherein the apparatus is configured such that:
the first application, the second application, and the third application are operating before the first user input, the second user input, and the third user input are detected;
the second application window representation and the third application window representation are presented simultaneously with the first window and exterior to the first window, such that the second application window representation includes a first Z-value and the third application window representation includes a second Z-value so that the second application window representation overlies, at least in part, the third application window representation, where, in response to a fourth user input, the presentation of the second application window representation and the third application window representation is changed such that a first visibility of the second application window representation is decreased while a second visibility of the third application window representation is increased;
the first window is presented in connection with at least one network browser application that is capable of being utilized to present a plurality of navigation tab representations including a first navigation tab representation associated with a first navigation tab and a second navigation tab representation associated with a second navigation tab that are presented such that the first navigation tab representation includes a third Z-value and the second navigation tab representation includes a fourth Z-value so that the first navigation tab representation overlies, at least in part, the second navigation tab representation, where, in response to a fifth user input, the presentation of the first navigation tab representation and the second navigation tab representation is changed such that a third visibility of the first navigation tab representation is decreased while a fourth visibility of the second navigation tab representation is increased; and
in response to a sixth user input, the presentation of the navigation tab representations and the application window representations is changed such that the first visibility of the second application window representation and the second visibility of the third application window representation is increased while the third visibility of the first navigation tab representation and the fourth visibility of the second navigation tab representation is decreased.

117. The apparatus of claim 116, wherein the apparatus is configured such that: the second application window representation and the third application window representation are presented simultaneously with the first window and exterior to the first window in response to a dragging and dropping in connection with the first window, the second user input is in connection with the second application window representation, and the first size of the first window and the second size of the second window are symmetric in response to the second user input and are asymmetric in response to the third user input.

118. The apparatus of claim 116, wherein the apparatus is configured such that the fourth user input, the fifth user input, and the sixth user input occur prior to the second user input and the third user input.

119. The apparatus of claim 116, wherein the apparatus is configured such that the sixth user input is detected in connection with a border between the application window representations and the first and second tab navigation representations.

120. The apparatus of claim 116, wherein the apparatus is configured such that the first visibility of the second application window representation, the second visibility of the third application window representation, the third visibility of the first navigation tab representation, and the fourth visibility of the second navigation tab representation are collectively capable of being user-configurable via the respective: fourth user input, the fifth user input, and the sixth user input, while each of the second application window representation, the third application window representation, the first navigation tab representation, and the second navigation tab representation are simultaneously at least partially visible, for reducing an amount of time to simultaneously access data associated with any multiple of the second window, the third window, the first navigation tab, and the second navigation tab.

121. The apparatus of claim 116, wherein the apparatus is configured such that the first visibility of the second application window representation, the second visibility of the third application window representation, the third visibility of the first navigation tab representation, and the fourth visibility of the second navigation tab representation are each capable of being user-configurable via at least one of: the fourth user input, the fifth user input, or the sixth user input, while each of the second application window representation, the third application window representation, the first navigation tab representation, and the second navigation tab representation are simultaneously at least partially visible, for facilitating simultaneous access to data associated with any multiple of the second window, the third window, the first navigation tab, and the second navigation tab.

122. The apparatus of claim 116, wherein the apparatus is configured such that a degree of the first visibility of the second application window representation, the second visibility of the third application window representation, the third visibility of the first navigation tab representation, and the fourth visibility of the second navigation tab representation are each capable of being bound while each of the second application window representation, the third application window representation, the first navigation tab representation, and the second navigation tab representation are simultaneously at least partially visible, for facilitating simultaneous access to data associated with any multiple of the second window, the third window, the first navigation tab, and the second navigation tab.

123. The apparatus of claim 116, wherein the apparatus is configured such that:
the navigation tab representations include a first set of navigation tab representations and the at least one network browser application is further capable of being utilized to present a second set of navigation tab representations including a third navigation tab representation associated with a third navigation tab and a fourth navigation tab representation associated with a fourth navigation tab that are presented adjacent and exterior to the first set of navigation tab representations such that the third navigation tab representation includes a fifth Z-value and the fourth navigation tab representation includes a sixth Z-value so that the third navigation tab representation overlies, at least in part, the fourth navigation tab representation, where, in response to a seventh user input, the presentation of the third navigation tab representation and the fourth navigation tab representation is changed such that a fifth visibility of the third navigation tab representation is decreased while a sixth visibility of the fourth navigation tab representation is increased.

124. The apparatus of claim 123, wherein the apparatus is configured such that: in response to the sixth user input, the presentation of the application window representations, and at least one of: the first set of navigation tab representations or the second set of navigation tab representations, is changed.

125. The apparatus of claim 116, wherein the apparatus is configured such that the first window includes a first network browser window, where, in response to a seventh user input in connection with the first network browser window, a second network browser window is presented adjacent to the first network browser window.

126. The apparatus of claim 125, wherein the apparatus is configured such that the seventh user input modifies a location of the first network browser window.

127. The apparatus of claim 125, wherein the apparatus is configured such that the second network browser window is presented so as to be tiled with the first network browser window.

128. The apparatus of claim 125, wherein the apparatus is configured such that, in response to an eighth user input in connection with a border between the first network browser window and the second network browser window, the presentation of the first network browser window and the second network browser window is changed such that a first network browser window size of the first network browser window and a second network browser window size of the second network browser window are both changed.

129. The apparatus of claim 66, wherein the apparatus is configured such that a first spinner and a second spinner are simultaneously presented.

130. The apparatus of claim 129, wherein the apparatus is configured such that the application window representations are components of the first spinner and a plurality of navigation tab representations are components of the second spinner.

131. The apparatus of claim 130, wherein the apparatus is configured such that a first visibility of the first spinner and the application window representations thereof, as well as a second visibility of the second spinner and the navigation tab representations thereof are both bound in an opposite manner while each of the application window representations and each of the navigation tab representations are simultaneously at least partially visible, for facilitating simultaneous access to data associated with any multiple of the first window, the second window, a first navigation tab, and a second navigation tab.

132. The apparatus of claim 130, wherein the apparatus is configured such that the first size in connection with the first spinner and the application window representations thereof, as well as the second size in connection with the second spinner and the navigation tab representations thereof are oppositely bound while maintaining each of the application window representations and each of the navigation tab representations to be simultaneously at least partially visible, for facilitating simultaneous access to data associated with any multiple of the first window, the second window, a first navigation tab, and a second navigation tab.

133. The apparatus of claim 130, wherein the apparatus is configured such that the first size in connection with the first spinner and the application window representations thereof, as well as the second size in connection with the second spinner and the navigation tab representations thereof are inversely proportional while each of the application window representations and each of the navigation tab representations are simultaneously at least partially visible, for facilitating simultaneous access to data associated with any multiple of the first window, the second window, a first navigation tab, and a second navigation tab.

134. The apparatus of claim 130, wherein the apparatus is configured such that: the second application window representation and the third application window representation of the first spinner are capable of being at least partially presented simultaneously with the first window and in an area exterior to the first window; and the navigation tab representations are capable of being presented in connection with the second window of the second application, which is a network browser application.

135. The apparatus of claim 66, wherein the apparatus is configured such that the first window includes a first network browser window, where, in response to a fourth user input in connection with the first network browser window that modifies a location of the first network browser window, a second network browser window is presented adjacent to the first network browser window.

136. The apparatus of claim 135, wherein the apparatus is configured such that, in response to a fifth user input in connection with a border between the first network browser window and the second network browser window, the presentation of the first network browser window and the second network browser window is changed such that a first network browser window size of the first network browser window and a second network browser window size of the second network browser window are both changed.

137. The apparatus of claim 66, wherein the apparatus is configured such that: the first window is presented in connection with at least one network browser application that is capable of being utilized to present a plurality of navigation tab representations including a first navigation tab representation and a second navigation tab representation that are presented such that the first navigation tab representation includes a first Z-value and the second navigation tab representation includes a second Z-value so that the first navigation tab representation overlies, at least in part, the second navigation tab representation.

138. The apparatus of claim 137, wherein the apparatus is configured such that, in response to a fourth user input, the presentation of the first navigation tab representation and the second navigation tab representation is changed such that a first visibility of the first navigation tab representation is decreased while a second visibility of the second navigation tab representation is increased.

139. The apparatus of claim 137, wherein the apparatus is configured such that: the navigation tab representations include a first set of navigation tab representations and the at least one network browser application is further capable of being utilized to present a second set of navigation tab representations including a third navigation tab representation associated with a third navigation tab and a fourth navigation tab representation associated with a fourth navigation tab that are presented adjacent and exterior to the first set of navigation tab representations such that the third navigation tab representation includes a third Z-value and the fourth navigation tab representation includes a fourth Z-value so that the third navigation tab representation overlies, at least in part, the fourth navigation tab representation.

140. The apparatus of claim 139, wherein the apparatus is configured such that: in response to a fourth user input, the presentation of the third navigation tab representation and the fourth navigation tab representation is changed such that a first visibility of the third navigation tab representation is decreased while a second visibility of the fourth navigation tab representation is increased.

141. The apparatus of claim 139, wherein the apparatus is configured such that the first set of navigation tab representations and the second set of navigation tab representations spin.

142. The apparatus of claim 139, wherein the apparatus is configured such that the first set of navigation tab representations and the second set of navigation tab representations separately spin.

143. The apparatus of claim 139, wherein the apparatus is configured such that the first set of navigation tab representations and the second set of navigation tab representations are included with spinners.

144. The apparatus of claim 66, wherein the apparatus is configured such that: the first window is presented in connection with at least one network browser application that is capable of being utilized to present a first set of navigation tab representations, and a second set of navigation tab representations that are presented adjacent and exterior to the first set of navigation tab representations.

145. The apparatus of claim 124, wherein the apparatus is configured such that:
the second application window representation includes a first Z-value and the third application window representation includes a second Z-value so that the second application window representation overlies, at least in part, the third application window representation;
a fourth user input is detected in connection with at least one of the second application window representation or the third application window representation; and
in response to fourth fifth user input, the presentation of the second application window representation and the third application window representation is changed such that a first visibility of the second application window representation is increased while a second visibility of the third application window representation is decreased.

146. The apparatus of claim 66, wherein the apparatus is configured such that the first window includes a first network browser window, where, in response to a fourth user input in connection with the first network browser window, a second network browser window is presented adjacent to the first network browser window.

147. The apparatus of claim 146, wherein the apparatus is configured such that the fourth user input modifies a location of the first network browser window.

148. The apparatus of claim 146, wherein the apparatus is configured such that the fourth user input is in connection with a menu item.

149. The apparatus of claim 146, wherein the apparatus is configured such that the second network browser window is presented so as to be tiled with the first network browser window.

150. The apparatus of claim 146, wherein the apparatus is configured such that the fourth user input is a touch input.

151. The apparatus of claim 146, wherein the apparatus is configured such that, in response to a fifth user input in connection with a border between the first network browser window and the second network browser window, the presentation of the first network browser window and the second network browser window is changed such that a first network browser window size of the first network browser window and a second network browser window size of the second network browser window are both changed.

152. The apparatus of claim 66, wherein the apparatus is configured such that the second application window representation and the third application window representation are presented in different locations as a function of different user input in connection with the first window.

153. The apparatus of claim 1, wherein:
said screen operatively coupled to the at least one processor is configured to present, utilizing the at least one processor, the application window representation group simultaneously with the first window without overlapping the first window;
said input device operatively coupled to the at least one processor is configured to detect, utilizing the at least one processor, a fourth user input; and
said screen operatively coupled to the at least one processor is configured to, utilizing the at least one processor and in response to the fourth user input, change the presentation of the first window and the application window representation group, such that a particular size of the first window and a third size of the application window representation group are changed such that at least one of a first visibility of the second application window representation or a second visibility of the third application window representation is changed.

154. The apparatus of claim 153, wherein:
said screen operatively coupled to the at least one processor is configured such that the second application window representation includes a first Z-value and the third application window representation includes a second Z-value so that the second application window representation overlies, at least in part, the third application window representation;
said input device operatively coupled to the at least one processor is configured to detect, utilizing the at least one processor, a fifth user input in connection with at least one of the second application window representation or the third application window representation; and
said screen operatively coupled to the at least one processor is configured to change, utilizing the at least one processor and in response to the fifth user input, the presentation of the second application window representation and the third application window representation such that the first visibility of the second application window representation is decreased while the second visibility of the third application window representation is increased.

155. The apparatus of claim 154, wherein the apparatus is configured such that the first size of the first window and the second size of the second window are symmetric in response to the second user input and asymmetric in response to the third user input.

156. The apparatus of claim 155, wherein:
said apparatus is configured such that the first application includes at least one browser application capable of presenting a plurality of navigation tab representations in connection with the first window including a first navigation tab representation associated with a first navigation tab and a second navigation tab representation associated with a second navigation tab, such that the first navigation tab representation includes a third Z-value and the second navigation tab representation includes a fourth Z-value where the first navigation tab representation overlies, at least in part, the second navigation tab representation;
said input device operatively coupled to the at least one processor is configured to detect, utilizing the at least one processor, a sixth user input in connection with at least one of the first navigation tab representation or the second navigation tab representation; and
said screen operatively coupled to the at least one processor is configured to change, utilizing the at least one processor and in response to the sixth user input, the presentation of the first navigation tab representation and the second navigation tab representation such that a third visibility of the first navigation tab representation is decreased while a fourth visibility of the second navigation tab representation is increased.

157. The apparatus of claim 156, wherein the apparatus is configured such that the third user input is detected in connection with a border between the first window and the second window.

158. The apparatus of claim 156, wherein the apparatus is configured such that the fourth user input includes moving a border between the application window representation group and the first window.

159. The apparatus of claim 156, wherein the apparatus is configured such that the application window representations and the first window are non-overlapping before and after the fourth user input.

160. The apparatus of claim 156, wherein the apparatus is configured such that the application window representations include thumbnails.

161. The apparatus of claim 156, wherein the apparatus is configured such that the application window representations are menu items of a first menu, and the first and second navigation tab representations are separate menu items of a second menu.

162. The apparatus of claim 156, wherein the apparatus is configured such that the application window representations are part of a first spinner, and the first and second navigation tab representations are part of a second spinner.

163. The apparatus of claim 156, wherein the apparatus is configured such that the application window representations spin with respect to each other, and the first and second navigation tab representations spin with respect to each other.

164. The apparatus of claim 156, wherein the apparatus is configured such that: the application window representations are presented before the detection of the first user input, and a first application window representation associated with the first application is presented with the application window representations, such that the first user input includes a dragging and dropping in connection with the first application window representation associated with the first application that results in the presentation of the first window.

165. The apparatus of claim 156, wherein the apparatus is configured such that the first visibility of the second application window representation, the second visibility of the third application window representation, the third visibility of the first navigation tab representation, and the fourth visibility of the second navigation tab representation are all capable of being user-configurable while each of the second application window representation, the third application window representation, the first navigation tab representation, and the second navigation tab representation are simultaneously at least partially visible, for reducing an amount of time to simultaneously access data associated with any multiple of the first window, the second window, the first navigation tab, and the second navigation tab.

166. The apparatus of claim 156, wherein the apparatus is configured such that the first visibility of the second application window representation, the second visibility of the third application window representation, the third visibility of the first navigation tab representation, and the fourth visibility of the second navigation tab representation are all capable of being user-configurable while each of the second application window representation, the third application window representation, the first navigation tab representation, and the second navigation tab representation are simultaneously at least partially visible, for facilitating simultaneous access to data associated with multiple of the first window, the second window, the first navigation tab, and the second navigation tab.

167. The apparatus of claim 156, wherein the apparatus is configured such that a degree of the first visibility of the second application window representation, the second visibility of the third application window representation, the third visibility of the first navigation tab representation, and the fourth visibility of the second navigation tab representation are capable of being bound while each of the second application window representation, the third application window representation, the first navigation tab representation, and the second navigation tab representation are simultaneously at least partially visible, for facilitating simultaneous access to data associated with at least two of: the first window, the second window, the first navigation tab, and the second navigation tab.

168. The apparatus of claim 66, wherein the apparatus is configured such that at least one attribute of the application window representations and the first window are inversely bound for facilitating simultaneous access to data associated with at least one of the second application or the third application, along with data associated with the first application.

169. The apparatus of claim 168, wherein the at least one attribute includes size.

170. The apparatus of claim 168, wherein the at least one attribute includes location.

171. The apparatus of claim 168, wherein the at least one attribute includes visibility.

172. The apparatus of claim 168, wherein the at least one attribute includes visibility, size, and location.

173. The apparatus of claim 66, wherein the apparatus is configured such that, in response to the third user input, the presentation of the first window or the second window is changed, such that at least one of: the first window fills a first space identified by the third user input, or the second window fills a second space identified by the third user input.

174. The apparatus of claim 173, wherein the apparatus is configured such that at least one of: the first space is a largest empty space in a first portion of the screen identified by the third user input, or the second space is a largest empty space in a second portion of the screen identified by the third user input.

175. The apparatus of claim 66, wherein the apparatus is configured such that a menu is capable of being presented such that the menu overlies at least part of the first window and the second window and is transparent, at least in part, for permitting the first window and the second window to be at least partially presented, simultaneously with the menu.

176. The apparatus of claim 175, wherein the apparatus is configured such that the menu includes a plurality of menu items each associated with different applications.

177. The apparatus of claim 175, wherein the apparatus is configured such that the transparency of the menu is user-configurable.

178. The apparatus of claim 175, wherein the apparatus is configured such that the menu is only partially hidden before being presented, and is capable of being presented in response to a fourth user input.

179. The apparatus of claim 178, wherein the apparatus is configured such that the fourth user input includes a drag operation.

180. The apparatus of claim 179, wherein the apparatus is configured such that a visibility of the menu changes as the drag operation is performed.

181. The apparatus of claim 66, wherein the apparatus is configured such that a color of a border between the first window and the second window is changed based on a change in an input focus in connection with at least one of the first window or the second window.

182. The apparatus of claim 66, wherein the apparatus is configured such that, in response to a fourth user input in connection with a resource presented in the first window, the resource is processed by the second application.

183. The apparatus of claim 182, wherein the apparatus is configured such that the second data reflects the processing of the resource by the second application.

184. The apparatus of claim 182, wherein the apparatus is configured such that the resource includes the first data associated with the first application.

185. The apparatus of claim 71, wherein the apparatus is configured such that a menu is operable for being presented such that the menu is capable of overlying the first window, the second application window representation, and the third application window representation, where the menu is transparent, at least in part, for permitting the first window, the second application window representation, and the third application window representation to be at least partially presented, simultaneously with the menu.

186. The apparatus of claim 185, wherein the apparatus is configured such that:
   the menu includes a plurality of menu items each associated with different applications;
   the transparency of the menu is user-configurable; and
   the menu is only partially hidden before being presented, and is capable of being presented in response to a fifth user input including a drag operation.

187. The apparatus of claim 116, wherein the apparatus is configured such that a menu is operable for being presented such that the menu is capable of overlying the application window representations and the navigation tab representations, where the menu is transparent, at least in part, for permitting the application window representations and the navigation tab representations to be at least partially presented, simultaneously with the menu.

188. The apparatus of claim 187, wherein the apparatus is configured such that:
   the menu includes a plurality of menu items each associated with different applications;
   the transparency of the menu is user-configurable; and
   the menu is only partially hidden before being presented, and is capable of being presented in response to a seventh user input including a drag operation.

189. The apparatus of claim 71, wherein the apparatus is configured such that a color of a border between the first window and the second window is changed based on a change in an input focus in connection with at least one of the first window or the second window.

190. The apparatus of claim 116, wherein the apparatus is configured such that a color of a border between the first window and the second window is changed based on a change in an input focus in connection with at least one of the first window or the second window.

191. The apparatus of claim 71, wherein the apparatus is configured such that, in response to a fifth user input in connection with a resource presented in the first window, the resource is processed by the second application, where:
the second data reflects the processing of the resource by the second application; and
the resource includes the first data associated with the first application.

192. The apparatus of claim 116, wherein the apparatus is configured such that, in response to a seventh user input in connection with a resource presented in the first window, the resource is processed by the second application, where:
the second data reflects the processing of the resource by the second application; and
the resource includes the first data associated with the first application.

193. The system of claim 16, wherein said user interface monitor component is configured such that:
the second application window representation and the third application window representation are presented simultaneously with the first window and exterior to the first window, such that the second application window representation includes a first Z-value and the third application window representation includes a second Z-value so that the second application window representation overlies, at least in part, the third application window representation, where, in response to a fourth user input, the presentation of the second application window representation and the third application window representation is changed such that a first visibility of the second application window representation is decreased while a second visibility of the third application window representation is increased;
the first window is presented in connection with at least one network browser application that is capable of being utilized to present a plurality of navigation tab representations including a first navigation tab representation associated with a first navigation tab and a second navigation tab representation associated with a second navigation tab that are presented such that the first navigation tab representation includes a third Z-value and the second navigation tab representation includes a fourth Z-value so that the first navigation tab representation overlies, at least in part, the second navigation tab representation, where, in response to a fifth user input, the presentation of the first navigation tab representation and the second navigation tab representation is changed such that a third visibility of the first navigation tab representation is decreased while a fourth visibility of the second navigation tab representation is increased; and
in response to a sixth user input, the presentation of the navigation tab representations and the application window representations is changed such that the first visibility of the second application window representation and the second visibility of the third application window representation is increased while the third visibility of the first navigation tab representation and the fourth visibility of the second navigation tab representation is decreased.

194. The system of claim 16, wherein said second means is further for operating such that:
the second application window representation and the third application window representation are presented simultaneously with the first window and exterior to the first window, such that the second application window representation includes a first Z-value and the third application window representation includes a second Z-value so that the second application window representation overlies, at least in part, the third application window representation, where, in response to a fourth user input, the presentation of the second application window representation and the third application window representation is changed such that a first visibility of the second application window representation is decreased while a second visibility of the third application window representation is increased;
the first window is presented in connection with at least one network browser application that is capable of being utilized to present a plurality of navigation tab representations including a first navigation tab representation associated with a first navigation tab and a second navigation tab representation associated with a second navigation tab that are presented such that the first navigation tab representation includes a third Z-value and the second navigation tab representation includes a fourth Z-value so that the first navigation tab representation overlies, at least in part, the second navigation tab representation, where, in response to a fifth user input, the presentation of the first navigation tab representation and the second navigation tab representation is changed such that a third visibility of the first navigation tab representation is decreased while a fourth visibility of the second navigation tab representation is increased; and
in response to a sixth user input, the presentation of the navigation tab representations and the application window representations is changed such that the first visibility of the second application window representation and the second visibility of the third application window representation is increased while the third visibility of the first navigation tab representation and the fourth visibility of the second navigation tab representation is decreased.

195. The apparatus of claim 66, wherein the apparatus is configured such that, in response to a fourth user input: a first border of the first window associated with the first application and a second border of the second window associated with the second application are bound; such that: the first window and the second window, in response to a fifth user input, are restored in size coincidently with the first and second borders thereof maintained bound when restored.

196. The apparatus of claim 66, wherein the apparatus is configured such that, in response to a fourth user input: a first border of the first window associated with the first application and a second border of the second window associated with the second application are bound, and initial sizes of the first window and the second window are bound; such that:
the first window and the second window, in response to a fifth user input, are minimized in size together, and the first window and the second window, in response to a sixth user input, are restored in size together.

197. The apparatus of claim 66, wherein the apparatus is configured such that, in response to a fourth user input: storing binding information indicating that a first border of the first window associated with the first application and a second border of the second window associated with the second application are bound, and predetermined sizes of the first window and the second window are bound; such that, thereafter: the first window and the second window, in response to a fifth user input, are minimized in size coincidently, and the first window and the second window, in response to a sixth user input and utilizing the binding information, are restored in size coincidently with the first and second borders thereof maintained bound when restored.

198. The apparatus of claim 66, wherein the apparatus is configured such that, in response to a fourth user input that involves a first application identifier associated with the first application and a second application identifier associated with the second application: a first border of the first window associated with the first application and a second border of the second window associated with the second application are bound, and sizes of the first window and the second window are bound; such that: the first window and the second window, in response to a fifth user input, are minimized in size together, and the first window and the second window, in response to a sixth user input on a menu item, are restored in size together with the first and second borders thereof maintained bound when restored.

199. The apparatus of claim 66, wherein the apparatus is configured such that, in response to a fourth user input that identifies the first application and the second application in connection with a mapping: storing binding information indicating the mapping; such that, thereafter: the first window and the second window, in response to a fifth user input, are minimized in size together, and the first window and the second window, in response to a sixth user input on a menu item and utilizing the binding information, are restored in size together with at least one border thereof bound when restored.

200. The apparatus of claim 66, wherein the apparatus is configured such that, in response to a fourth user input that identifies the first application and the second application for mapping purposes: storing binding information indicating that a first border of the first window associated with the first application and a second border of the second window associated with the second application are bound; such that, thereafter: the first window and the second window, in response to a fifth user input and utilizing the binding information, are together changed from an invisible state to a visible state with the first and second borders thereof bound when changed.

201. The apparatus of claim 66, wherein the apparatus is configured such that, in response to a single fourth user input on a menu item, the first window and the second window are both changed from an invisible state, to a visible state with at least one border thereof bound.

202. The apparatus of claim 66, wherein the apparatus is configured such that, in response to a fourth user input, the first window and the second window are simultaneously changed from an uninitialized state where both the first window and the second window are invisible, to an initialized state, where both the first window and the second window are visible, and a first border of the first window and a second border of the second window are mapped.

203. The apparatus of claim 202, wherein the apparatus is configured such that at least one of the first application or the second application is required to be started prior to the fourth user input.

204. The apparatus of claim 66, wherein the apparatus is configured such that, in response to a fourth user input, the first application and the second application are simultaneously changed from a non-operating state where both the first window and the second window are invisible, to an operating system state where: both the first window and the second window are visible, and a first border of the first window and a second border of the second window are mapped.

205. The apparatus of claim 66, wherein the apparatus is configured such that, in response to a fourth user input, the first window and the second window are changed from an invisible state to a matched visible state.

* * * * *

UNITED STATES PATENT AND TRADEMARK OFFICE
CERTIFICATE OF CORRECTION

PATENT NO. : 9,823,838 B2
APPLICATION NO. : 14/331096
DATED : November 21, 2017
INVENTOR(S) : Robert Paul Morris It is certified that error appears in the above-identified patent and that said Letters Patent is hereby corrected as shown below:

In the Claims

In Claim 1, Column 26, Line 12, replace "window remains visible" with -- window remains --.

Signed and Sealed this
Twentieth Day of February, 2018

Andrei Iancu
*Director of the United States Patent and Trademark Office*

(12) EX PARTE REEXAMINATION CERTIFICATE (11708th)
United States Patent
Morris

(10) Number: US 9,823,838 C1
(45) Certificate Issued: Aug. 5, 2020

(54) METHODS, SYSTEMS, AND COMPUTER PROGRAM PRODUCTS FOR BINDING ATTRIBUTES BETWEEN VISUAL COMPONENTS

(71) Applicant: SITTING MAN, LLC, Raleigh, NC (US)

(72) Inventor: Robert Paul Morris, Raleigh, NC (US)

(73) Assignee: CYPRESS LAKE SOFTWARE, INC., Woodville, TX (US)

Reexamination Request:
No. 90/014,333, Jul. 3, 2019

Reexamination Certificate for:
Patent No.: 9,823,838
Issued: Nov. 21, 2017
Appl. No.: 14/331,096
Filed: Jul. 14, 2014

Certificate of Correction issued Feb. 20, 2018

Related U.S. Application Data

(63) Continuation of application No. 12/956,008, filed on Nov. 30, 2010, now Pat. No. 8,780,130.

(51) Int. Cl.
| | | |
|---|---|---|
| *G06F 3/048* | (2013.01) |
| *G06F 9/44* | (2018.01) |
| *G06F 17/24* | (2006.01) |
| *G06F 3/041* | (2006.01) |
| *G06F 3/0486* | (2013.01) |
| *G06F 3/0481* | (2013.01) |
| *G06F 3/0484* | (2013.01) |
| *G06F 3/0488* | (2013.01) |
| *G06F 40/166* | (2020.01) |
| *G06F 3/0482* | (2013.01) |
| *G06F 9/451* | (2018.01) |

(52) U.S. Cl.
CPC ............ *G06F 40/166* (2020.01); *G06F 3/041* (2013.01); *G06F 3/0481* (2013.01); *G06F 3/0482* (2013.01); *G06F 3/0484* (2013.01); *G06F 3/0486* (2013.01); *G06F 3/0488* (2013.01); *G06F 3/04842* (2013.01); *G06F 3/04845* (2013.01); *G06F 3/04883* (2013.01); *G06F 3/04886* (2013.01); *G06F 9/451* (2018.02); *G06F 2203/04104* (2013.01); *G06F 2203/04803* (2013.01); *G06F 2203/04808* (2013.01)

(58) Field of Classification Search
None
See application file for complete search history.

(56) References Cited

To view the complete listing of prior art documents cited during the proceeding for Reexamination Control Number 90/014,333, please refer to the USPTO's public Patent Application Information Retrieval (PAIR) system under the Display References tab.

*Primary Examiner* — Luke S Wassum

(57) ABSTRACT

Methods and systems are described for binding attributes between visual components. A first visual component, including a first presentation space for presenting first data by an operating first application, is detected. Binding information, for the first application, is identified that specifies a mapping between a first visual attribute of the first visual component and a second visual attribute of a second visual component including a second presentation space for presenting second data by a second application. A change to the first visual attribute is detected. In response to the detection of the change, change information is automatically sent to change the second visual attribute according to the mapping.

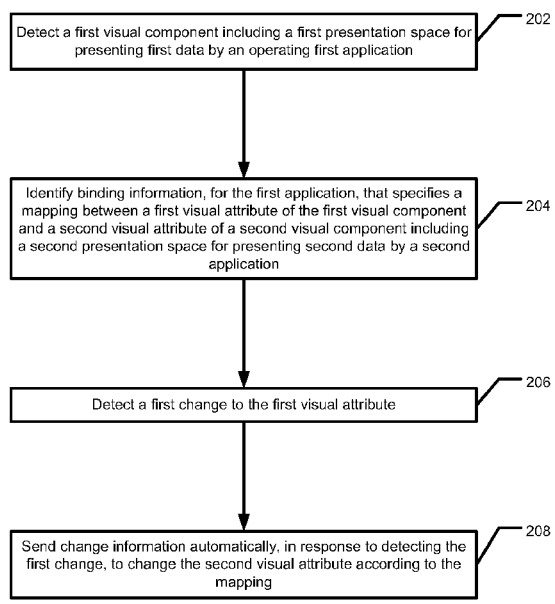

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 66, 175, 178-180 and 198 are cancelled.

Claims 1-65, 67-174, 176, 177, 181-197 and 199-205 were not reexamined.

\* \* \* \* \*